US010266008B2

(12) United States Patent
Miyazaki

(10) Patent No.: US 10,266,008 B2
(45) Date of Patent: *Apr. 23, 2019

(54) PNEUMATIC TIRE

(71) Applicant: SUMITOMO RUBBER INDUSTRIES, LTD., Kobe-shi, Hyogo (JP)

(72) Inventor: Tatsuya Miyazaki, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/534,831

(22) PCT Filed: Dec. 9, 2015

(86) PCT No.: PCT/JP2015/084476
§ 371 (c)(1),
(2) Date: Jun. 9, 2017

(87) PCT Pub. No.: WO2016/104144
PCT Pub. Date: Jun. 30, 2016

(65) Prior Publication Data
US 2017/0341468 A1 Nov. 30, 2017

(30) Foreign Application Priority Data
Dec. 24, 2014 (JP) .................. 2014-260947

(51) Int. Cl.
C08L 9/06 (2006.01)
B60C 1/00 (2006.01)
C08K 3/00 (2018.01)
C08L 9/00 (2006.01)
C08L 25/08 (2006.01)
C08L 47/00 (2006.01)
C08K 3/22 (2006.01)
C08K 3/34 (2006.01)

(52) U.S. Cl.
CPC .............. *B60C 1/0016* (2013.01); *B60C 1/00* (2013.01); *C08K 3/00* (2013.01); *C08K 3/22* (2013.01); *C08K 3/34* (2013.01); *C08L 9/00* (2013.01); *C08L 9/06* (2013.01); *C08L 25/08* (2013.01); *C08L 47/00* (2013.01); *C08K 2003/2227* (2013.01); *C08L 2205/02* (2013.01)

(58) Field of Classification Search
CPC ......... B60C 1/0016; B60C 1/00; C08L 47/00; C08L 25/08; C08L 9/06; C08L 2205/02; C08L 9/00; C08K 3/34; C08K 3/22; C08K 2003/2227; C08K 3/00
See application file for complete search history.

(56) References Cited

U.S. PATENT DOCUMENTS

| 4,929,679 A | 5/1990 | Akita et al. |
| 6,130,283 A * | 10/2000 | Nippa ....................... C01F 7/02 152/905 |
| 6,186,204 B1 * | 2/2001 | Sasaka .................. B60C 1/0016 152/209.5 |
| 2004/0030027 A1 | 2/2004 | Konno et al. |
| 2005/0215697 A1 | 9/2005 | Matsui |
| 2007/0123636 A1 * | 5/2007 | Hattori .................. B60C 1/0016 524/515 |
| 2010/0113703 A1 | 5/2010 | Houjo et al. |
| 2011/0213049 A1 | 9/2011 | Takizawa |
| 2014/0155520 A1 * | 6/2014 | Takeda .................. B60C 1/0016 523/156 |
| 2016/0272796 A1 * | 9/2016 | Washizu ................... C08L 9/00 |
| 2017/0327670 A1 | 11/2017 | Miyazaki et al. |
| 2017/0341468 A1 | 11/2017 | Miyazaki |

FOREIGN PATENT DOCUMENTS

| EP | 2103650 A1 | 9/2009 |
| EP | 2799480 A1 | 11/2014 |
| EP | 3081587 A1 | 10/2016 |
| EP | 3165566 A1 | 5/2017 |
| JP | 9-309978 A | 12/1997 |
| JP | 2004-137463 A | 5/2004 |
| JP | 2005-350535 A | 12/2005 |
| JP | 2007/177209 A | 7/2007 |
| JP | 2008-184505 A | 8/2008 |
| JP | 2008-208265 A | 9/2008 |
| JP | 2009-138025 A | 6/2009 |
| JP | 2011-88998 A | 5/2011 |
| JP | 2013-1805 A | 1/2013 |
| JP | 2013-166826 A | 8/2013 |
| JP | 2014-231612 A | 12/2014 |

(Continued)

OTHER PUBLICATIONS

English language translation of JP 2009-138025, pp. 1-10, Jan. 22, 2018.*

(Continued)

*Primary Examiner* — Alexander C Kollias
(74) *Attorney, Agent, or Firm* — Birch, Stewart, Kolasch & Birch LLP

(57) ABSTRACT

Provided is a pneumatic tire including a tread formed from a rubber composition highly improving wet-grip performance, dry-grip performance, and durability while maintaining a good balance therebetween. A pneumatic tire including a tread formed from a rubber composition, the composition containing 90% by mass or more of a diene rubber per 100% by mass of the rubber component, the composition further containing a hydrogenated terpene aromatic resin obtained by hydrogenation of double bonds of a terpene aromatic resin, the hydrogenated terpene aromatic resin having a degree of hydrogenation of double bonds of 5-100% and a hydroxyl value of 20 mg KOH/g or less, the hydrogenated terpene aromatic resin being present in an amount of 1-50 parts by mass per 100 parts by mass of the diene rubber, the composition further containing specific inorganic filler in an amount of 1-70 parts by mass per 100 parts by mass of the diene rubber.

10 Claims, No Drawings

(56) References Cited

FOREIGN PATENT DOCUMENTS

| JP | WO2016/104142 A1 | 6/2016 |
| JP | WO2016/104144 A1 | 6/2016 |
| WO | WO 02/20655 A1 | 3/2002 |
| WO | WO 2015/104955 A1 | 7/2015 |
| WO | WO 2016/002506 A1 | 1/2016 |

OTHER PUBLICATIONS

Yasuhara Chemical, pp. 1-3, no publication date given.*
International Search Report, issued in PCT/JP2015/084476, PCT/ISA/210, dated Mar. 1, 2016.
Written Opinion of the International Searching Authority, issued in PCT/JP2015/084476, PCT/ISA/237, dated Mar. 1, 2016.
Machine translation of JP-2008-184505-A, published Aug. 14, 2008 (both machine translation and Japanese original provided).
Machine translation of JP-2009-138025-A, published Jun. 25, 2009 (both machine translation and Japanese original provided).
Machine translation of JP-2013-166826-A, published Aug. 29, 2013 (both machine translation and Japanese original provided).
International Search Report, issued in PCT/JP2015/084474, PCT/ISA/210, dated Mar. 1, 2016.
Written Opinion of the International Searching Authority, issued in PCT/JP2015/084474, PCT/ISA/237, dated Mar. 1, 2016.

* cited by examiner

PNEUMATIC TIRE

TECHNICAL FIELD

The present invention relates to a pneumatic tire including a tread formed from a rubber composition.

BACKGROUND ART

There is a need for treads for tires that have excellent grip performance on both wet and dry roads. It has been known that the grip performance, especially wet grip performance, of rubber compositions for treads can be improved by incorporation of α-methylstyrene-based resins (see, for example, Patent Literature 1). Other known methods include the incorporation of terpene-based resins such as polyterpene, terpene phenol resins, or terpene aromatic resins.

In order to improve dry grip performance, it is necessary to improve tan δ at 20° C. Unfortunately, this at the same time leads to an increase in tan δ at 30 to 70° C., which is an indicator of rolling resistance, and is thus not desirable. For example, known methods include the use of Koresin, coumarone-indene resins, styrene acrylic resins, or the like; however, these methods at the same time lead to greatly increased rolling resistance and are thus difficult to use in applications where fuel economy is important.

In general, resins used to improve grip performance (grip resins) function to increase the viscoelastic properties, hysteresis loss, and especially tan δ of rubber. In addition, such resins also function to increase the adhesion between the tread and the road surface as they bloom to the tread surface during running, thereby forming an adhesive bloom layer together with process oils, polymer decomposition products, low molecular weight organic materials, and other components. It is considered that the above effects together contribute to the improvement of grip performance.

CITATION LIST

Patent Literature

Patent Literature 1: JP 2013-1805 A

SUMMARY OF INVENTION

Technical Problem

As described above, attempts have been made to improve grip performance, but none of them has achieved a high-level, balanced improvement in wet grip performance, dry grip performance, and durability.

The present invention aims to solve the above problems and provide a pneumatic tire including a tread formed from a rubber composition that can highly improve wet grip performance, dry grip performance, and durability while maintaining a good balance between them.

Solution to Problem

The present invention relates to a pneumatic tire, including a tread formed from a rubber composition, the rubber composition containing a rubber component that includes a diene rubber in an amount of 90% by mass or more based on 100% by mass of the rubber component, the rubber composition further containing a hydrogenated terpene aromatic resin obtained by hydrogenation of double bonds of a terpene aromatic resin, the hydrogenated terpene aromatic resin having a degree of hydrogenation of double bonds of 5% to 100% and a hydroxyl value of 20 mg KOH/g or less, the hydrogenated terpene aromatic resin being present in an amount of 1 to 50 parts by mass per 100 parts by mass of the diene rubber, the rubber composition further containing an inorganic filler having a nitrogen adsorption specific surface area of 10 to 120 m²/g, the inorganic filler including at least one selected from the group consisting of compounds represented by the formula below, magnesium sulfate, and silicon carbide, the inorganic filler being present in an amount of 1 to 70 parts by mass per 100 parts by mass of the diene rubber,

$$mM \cdot xSiO_y \cdot zH_2O$$

wherein M represents at least one metal selected from the group consisting of Al, Mg, Ti, Ca, and Zr, or an oxide or hydroxide of the metal; m represents an integer of 1 to 5; x represents an integer of 0 to 10; y represents an integer of 2 to 5; and z represents an integer of 0 to 10.

The inorganic filler is preferably aluminum hydroxide.

The hydrogenated terpene aromatic resin preferably has a softening point of 80° C. to 180° C., more preferably 114° C. to 160° C.

The hydrogenated terpene aromatic resin preferably has a hydroxyl value of 0 mg KOH/g.

The diene rubber preferably includes 60% by mass or more of a styrene-butadiene rubber having a styrene content of 19% to 60% by mass.

Advantageous Effects of Invention

The pneumatic tire of the present invention includes a tread formed from a rubber composition. The rubber composition contains: a rubber component including 90% by mass or more of a diene rubber; a hydrogenated terpene aromatic resin obtained by hydrogenation of the double bonds of a terpene aromatic resin and having a degree of hydrogenation of double bonds of 5% to 100% and a hydroxyl value of 20 mg KOH/g or less; and a certain inorganic filler having a predetermined nitrogen adsorption specific surface area. The rubber composition contains, per 100 parts by mass of the diene rubber, 1 to 50 parts by mass of the hydrogenated terpene aromatic resin and 1 to 70 parts by mass of the inorganic filler. Such a pneumatic tire provided by the present invention achieves a high-level, balanced improvement in wet grip performance, dry grip performance, and durability.

DESCRIPTION OF EMBODIMENTS

The pneumatic tire of the present invention includes a tread formed from a rubber composition. The rubber composition contains: a rubber component including 90% by mass or more of a diene rubber; a hydrogenated terpene aromatic resin obtained by hydrogenation of the double bonds of a terpene aromatic resin and having a degree of hydrogenation of double bonds of 5% to 100% and a hydroxyl value of 20 mg KOH/g or less; and a certain inorganic filler having a predetermined nitrogen adsorption specific surface area. The rubber composition contains, per 100 parts by mass of the diene rubber, 1 to 50 parts by mass of the hydrogenated terpene aromatic resin and 1 to 70 parts by mass of the inorganic filler.

By incorporating predetermined amounts of a specific hydrogenated terpene aromatic resin a specific inorganic filler into a rubber composition containing a diene rubber, it is possible to highly improve wet grip performance, dry grip performance, and durability while maintaining a good balance between them, as compared to conventional methods that use a combination of a low softening point resin and a high softening point resin or add a terpene-based resin or aromatic resin which is well miscible with rubber.

This is presumably because the hydrogenated terpene aromatic resin having a degree of hydrogenation of 5% to 100% and a hydroxyl value of 20 mg KOH/g or less has the properties described below which allow the above effects to be significantly achieved.

Since the hydrogenated terpene aromatic resin has a high structural flexibility due to being hydrogenated, the resin blooms to the tread surface fast despite its molecular weight and softening point. Moreover, the hydrogenated terpene aromatic resin, which has a reduced amount of double bonds due to hydrogenation, shows greatly increased dispersibility in the diene rubber, and at the same time promotes the crosslinking of rubber, without adsorbing the sulfur of the crosslinking agent, to produce uniform crosslinking sites between rubber polymers, thereby increasing the modulus of the vulcanized rubber composition. Furthermore, the uniform and tight crosslinking of rubber results in good durability and good blowing resistance. In addition, the hydrogenated terpene aromatic resin with a hydroxyl value of 20 mg KOH/g or less shows low self-aggregation properties in rubber, with the result that Shore hardness (Hs) at room temperature is low and high-temperature Hs is maintained, or in other words a small temperature dependence of Hs occurs.

The above effects are particularly pronounced when the rubber component includes a diene rubber.

It should be noted that, in general, hydrogenating a resin enhances its thermal stability and increases its shelf life. Thus, when the hydrogenated terpene aromatic resin is incorporated into rubber, the progression of pyrolysis and oxidation is reduced, resulting in odor reduction.

Furthermore, it is presumed that the incorporation of an inorganic filler such as aluminum hydroxide having a predetermined nitrogen adsorption specific surface area provides the following effects (1) to (4) which allow the above effects (especially the effect of improving wet grip performance) to be significantly achieved.

(1) During kneading, the incorporated inorganic filler such as aluminum hydroxide ($Al(OH)_3$) is partially converted to alumina ($Al_2O_3$) having a Mohs hardness equal to or higher than that of silica, or the inorganic filler such as aluminum hydroxide binds to silica (through covalent bonding or dehydration) so that it is immobilized by the finely-dispersed silica chains in the rubber compound. Such metal oxide masses or inorganic filler is considered to provide an anchoring effect to the micro-roughness (having a pitch of tens of micrometers) of the aggregates on the road surface, thereby enhancing wet grip performance.

(2) As a result of the contact (friction) between silicon dioxide on the road surface and the inorganic filler such as aluminum hydroxide on the tire surface during running, covalent bonds are considered to be instantaneously formed, thereby improving wet grip performance.

(3) A part of the tire surface on the wet road makes contact with the road surface through a water film. Usually, such a water film is considered to be evaporated by the friction heat generated in areas where the tire makes direct contact with the road surface. When aluminum hydroxide, for example, is incorporated, however, the friction heat is considered to contribute to the progression of the endothermic reaction of aluminum hydroxide on the tire surface as shown by "$Al(OH)_3 \rightarrow \frac{1}{2} Al_2O_3 + \frac{3}{2} H_2O$", thereby resulting in reduced evaporation of the water film (moisture). If the water film is evaporated, a void space is formed between the tire surface and the road surface and thus the road surface/tire contact area is reduced, resulting in a decrease in wet grip performance.

(4) When the phenomenon (1) or (2) occurs, the inorganic filler particles vibrate at high frequency during running. This high frequency vibration promotes blooming of adhesive components, such as grip resins and liquid components, in the adjacent rubber compositions. As a result, the amount of the adhesive components around the inorganic filler particles is increased compared to that in other parts containing no inorganic filler, which improves wet grip performance.

The rubber composition in the present invention further achieves improved dry grip performance by addition of an inorganic filler such as aluminum hydroxide having a predetermined nitrogen adsorption specific surface area. Particularly in running tests, many professional drivers have made the following comments on the incorporation of inorganic filler: the tread surface makes close contact with the road surface and shows a behavior as if grip resins bloomed to the surface. The reason for this is presumably as follows.

When a specific inorganic filler is incorporated into a rubber composition, a high tension is applied to the surface of the tread rubber particularly during small radius turning or drifting, which causes the tread rubber to vibrate at high frequency. When the high frequency vibration reaches 1000 Hz or higher, (A) grip resins and adhesive components bloom to the interface between the inorganic filler and the rubber component, thereby promoting road surface grip; (B) preferably, the inorganic filler physically or chemically binds to the neighboring silica and carbon black so that no large voids appear around the inorganic filler even during running; and (C) the inorganic filler in the form of fine particles having a predetermined nitrogen adsorption specific surface area increases the hysteresis of the rubber composition. These effects are considered to contribute to the improvement of dry grip performance.

Although wet grip performance can be improved by the effects caused by addition of conventional inorganic fillers such as aluminum hydroxide, abrasion resistance, abrasion appearance after abrasion, or other properties usually deteriorate in this case. Accordingly, it is difficult to achieve a balanced improvement in those properties. In the present invention, since an inorganic filler such as aluminum hydroxide having a predetermined nitrogen adsorption specific surface area is incorporated with a specific hydrogenated terpene aromatic resin, wet grip performance, dry grip performance, and durability can be highly improved while maintaining a good balance between them.

The rubber composition in the present invention contains a diene rubber in the rubber component. The use of a diene rubber in the rubber component provides good grip performance.

The term "grip performance" when used alone herein refers to a generic term that includes both wet grip performance and dry grip performance.

Any diene rubber may be used, and examples include isoprene-based rubbers such as natural rubber (NR), highly purified natural rubber (UPNR), deproteinized natural rubber (DPNR), epoxidized natural rubber (ENR), and polyisoprene rubber (IR), styrene-butadiene rubber (SBR), polybutadiene rubber (BR), styrene-isoprene-butadiene rubber (SIBR), chloroprene rubber (CR), and acrylonitrile butadiene rubber (NBR). Among these, for use in tires of passenger vehicles, in view of grip performance, the diene rubber preferably essentially includes SBR. More preferred are NR, SBR, and/or BR, with SBR and/or BR being still more preferred, with a combination of SBR and BR being particularly preferred. For use in tires of trucks and buses which have high ground contact pressure per unit area, the diene rubber is desirably based on NR which is excellent in tensile strength and tear strength.

Any styrene-butadiene rubber (SBR) may be used, and examples include emulsion-polymerized SBR (E-SBR) and solution-polymerized SBR (S-SBR) all of which may or may not be oil extended. Particularly in view of grip performance, oil extended high molecular weight SBR is preferred. Modified SBR such as chain end-modified or backbone-modified S-SBR, which exhibits increased interaction with filler, may also be used. These types of SBR may be used alone, or two or more of these may be used in combination.

The modified SBR may preferably be one coupled with tin, silicon, or the like. The modified SBR may be prepared by a coupling reaction in accordance with a conventional method, for example, by reacting the alkali metal (e.g. Li) or alkali earth metal (e.g. Mg) in the molecular chain end of the modified SBR with tin halide, silicon halide, or the like.

The modified SBR may also preferably be a copolymer of styrene and butadiene containing a primary amino group or an alkoxysilyl group. The primary amino group may be bound to the initiation end, the termination end, the backbone, or a side chain of the polymer. The primary amino group is preferably introduced into the initiation or termination end of the polymer because this can reduce energy loss from the polymer chain ends to improve hysteresis loss properties.

The modified SBR may suitably be obtained particularly by modifying the polymerizing end (active end) of solution-polymerized styrene-butadiene rubber (S-SBR) with a compound represented by the formula (3) below (modified S-SBR (modified SBR disclosed in JP 2010-111753 A)). In this case, the molecular weight of the polymer can be easily controlled, and thus the amount of low molecular weight components, which increase tan δ, can be reduced. In addition, the bond between silica and the polymer chain can be reinforced to further improve wet grip performance and other properties.

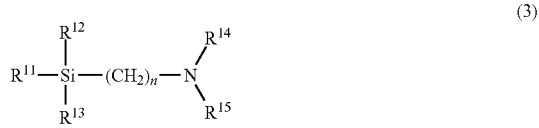

(3)

In formula (3), $R^{11}$, $R^{12}$, and $R^{13}$ are the same as or different from one another and each represent an alkyl group, an alkoxy group (preferably C1-C8, more preferably C1-C6, still more preferably C1-C4 alkoxy group), a silyloxy group, an acetal group, a carboxyl group (—COOH), a mercapto group (—SH), or a derivative thereof; $R^{14}$ and $R^{15}$ are the same as or different from one another and each represent a hydrogen atom or an alkyl group (preferably C1-C4 alkyl group); and n represents an integer (preferably of 1 to 5, more preferably 2 to 4, still more preferably 3).

Each of $R^{11}$, $R^{12}$, and $R^{13}$ is desirably an alkoxy group, and each of $R^{14}$ and $R^{15}$ is desirably a hydrogen atom. This provides excellent wet grip performance, fuel economy, and handling stability.

Specific examples of the compound of formula (3) include 3-aminopropyltrimethoxysilane, 3-aminopropyldimethylmethoxysilane, 3-aminopropylmethyldimethoxysilane, 2-dimethylaminoethyltrimethoxysilane, 3-diethylaminopropyltrimethoxysilane, and 3-(N,N-dimethylamino)propyltrimethoxysilane. These may be used alone, or two or more of these may be used in combination.

The modification of styrene-butadiene rubber with a compound (modifier) of formula (3) may be carried out by conventional methods, such as those disclosed in JP H06-53768 B, JP H06-57767 B, and JP 2003-514078 T. For example, the modification may be carried out by bringing styrene-butadiene rubber into contact with the modifier. Examples include methods in which, after the synthesis of styrene-butadiene rubber by anionic polymerization, a predetermined amount of the modifier is added to the polymer rubber solution to react the polymerizing end (active end) of the styrene-butadiene rubber with the modifier, or in which the modifier is added to a solution of styrene-butadiene rubber to react them.

The SBR preferably has a styrene content of 19% by mass or more, more preferably 21% by mass or more, still more preferably 25% by mass or more, particularly preferably 30% by mass or more. The styrene content is also preferably 60% by mass or less, more preferably 55% by mass or less, still more preferably 50% by mass or less, particularly preferably 45% by mass or less. When the styrene content is less than 19% by mass, insufficient grip performance may be obtained, while when the styrene content is more than 60% by mass, styrene groups may be located adjacent to one another so that the polymer becomes excessively hard and non-uniform crosslinking is more likely to occur, resulting in deterioration of durability. In addition, temperature dependence tends to increase so that larger changes in properties are obtained relative to changes in temperature, with the result that wet grip performance or dry grip performance tends not to be well achieved.

The styrene content of SBR as used herein is determined by $^1$H-NMR analysis.

The SBR preferably has a vinyl content of 10% by mass or more, more preferably 15% by mass or more, still more preferably 20% by mass or more, particularly preferably 25% by mass or more. When the vinyl content is less than 10% by mass, sufficient grip performance may not be obtained. The vinyl content is preferably 90% by mass or less, more preferably 80% by mass or less, still more preferably 70% by mass or less, particularly preferably 60% by mass or less. When the vinyl content is more than 90% by mass, such SBR is difficult to produce, and its yield may be unstable. In addition, such SBR may provide reduced rubber strength and thus unstable properties.

The vinyl content (1,2-butadiene unit content) of SBR as used herein can be determined by infrared absorption spectrometry.

The SBR preferably has a glass transition temperature (Tg) of −45° C. or higher, more preferably −40° C. or higher. The Tg is preferably 10° C. or lower, more preferably 5° C. or lower, still more preferably 0° C. or lower.

The glass transition temperature of SBR as used herein is determined by differential scanning calorimetry (DSC) at a rate of temperature rise of 10° C./min in accordance with JIS K 7121.

The SBR preferably has a weight average molecular weight (Mw) of 200,000 or more, more preferably 250,000 or more, still more preferably 300,000 or more. For use in racing tires or high wear tires, the Mw is particularly preferably 1,100,000 or more. The Mw is also preferably 2,000,000 or less, more preferably 1,800,000 or less. The use of SBR having a Mw of 200,000 or more provides higher grip performance, fuel economy, and durability. An Mw of more than 2,000,000 may lead to poor filler dispersion and deteriorated durability.

Herein, the weight average molecular weight of SBR can be determined by gel permeation chromatography (GPC) (GPC-8000 series available from Tosoh Corporation, detector: differential refractometer, column: TSKGEL SUPER-MALTPORE HZ-M available from Tosoh Corporation) calibrated with polystyrene standards.

For use in tires of passenger vehicles, the amount of SBR based on 100% by mass of the diene rubber is preferably 60% by mass or more, more preferably 65% by mass or more, still more preferably 70% by mass or more. When it is less than 60% by mass, grip performance tends not to be sufficient. The upper limit of the amount of SBR is not particularly limited and may be 100% by mass, but is preferably 90% by mass or less, more preferably 80% by mass or less.

In particular, the diene rubber preferably includes 60% by mass or more of SBR having a styrene content of 19% to 60% by mass, more preferably 65% by mass or more of SBR having a styrene content of 25% to 55% by mass. In this case, higher grip performance and higher durability can be achieved.

Any polybutadiene rubber (BR) may be used including, for example, high-cis content BR such as BR1220 available from Zeon Corporation and BR130B and BR150B both available from Ube Industries, Ltd.; modified BR such as BR1250H available from Zeon Corporation; BR containing syndiotactic polybutadiene crystals such as VCR412 and VCR617 both available from Ube Industries, Ltd.; and BR synthesized using rare earth catalysts such as BUNA-CB25 available from Lanxess. These types of BR may be used alone, or two or more of these may be used in combination. In view of abrasion resistance and fuel economy, preferred among these is BR synthesized using rare earth catalysts (rare earth-catalyzed BR).

The term "rare earth-catalyzed BR" refers to a polybutadiene rubber synthesized using a rare earth catalyst and is characterized by high cis content and low vinyl content. The rare earth-catalyzed BR may be one commonly used in the production of tires.

The rare earth catalyst used in the synthesis of the rare earth-catalyzed BR may be a known one. Examples include catalysts containing lanthanide rare earth compounds, organoaluminum compounds, aluminoxanes, or halogen-containing compounds, optionally with Lewis bases. Among these, neodymium (Nd) catalysts including Nd-containing compounds as lanthanide rare earth compounds are particularly preferred.

Examples of the lanthanide rare earth compounds include halides, carboxylates, alcoholates, thioalcoholates, and amides of rare earth metals of atomic numbers 57 to 71. Among these, Nd catalysts as described above are preferred because they allow the resulting BR to have high cis content and low vinyl content.

Examples of the organoaluminum compounds include compounds represented by the formula: $AlR^aR^bR^c$ wherein $R^a$, $R^b$, and $R^c$ are the same as or different from one another and each represent a hydrogen atom or a C1-C8 hydrocarbon group. Examples of the aluminoxanes include acyclic aluminoxanes and cyclic aluminoxanes. Examples of the halogen-containing compounds include aluminum halides represented by the formula: $AlX_kR^d_{3-k}$ wherein X represents a halogen atom, $R^d$ represents a C1-C20 alkyl, aryl, or aralkyl group, and k is 1, 1.5, 2, or 3; strontium halides such as $Me_3SrCl$, $Me_2SrCl_2$, $MeSrHCl_2$, and $MeSrCl_3$; and metal halides such as silicon tetrachloride, tin tetrachloride, and titanium tetrachloride. Lewis bases may be used for complexation of lanthanide rare earth compounds, and suitable examples include acetylacetone, ketones, and alcohols.

In the polymerization of butadiene, the rare earth catalyst may be used in solution in an organic solvent (e.g. n-hexane, cyclohexane, n-heptane, toluene, xylene, or benzene) or may be supported on an appropriate carrier, such as silica, magnesia, or magnesium chloride. With regard to the polymerization conditions, the polymerization may be either solution polymerization or bulk polymerization, preferably at a polymerization temperature of −30° C. to 150° C., and the polymerization pressure may be chosen appropriately depending on other conditions.

The rare earth-catalyzed BR preferably has a cis-1,4-linkage content (cis content) of 90% by mass or more, more preferably 93% by mass or more, still more preferably 95% by mass or more. If the cis content is less than 90% by mass, durability or abrasion resistance tends to deteriorate.

The rare earth-catalyzed BR preferably has a vinyl content of 1.8% by mass or less, more preferably 1.5% by mass or less, still more preferably 1.0% by mass or less, particularly preferably 0.8% by mass or less. If the vinyl content is more than 1.8% by mass, durability or abrasion resistance tends to deteriorate.

The vinyl content (1,2-butadiene unit content) and cis content (cis 1,4-linkage content) of BR as used herein can be measured by infrared absorption spectrometry.

When BR is incorporated, the amount of BR based on 100% by mass of the diene rubber is preferably 10% by mass or more, more preferably 15% by mass or more, still more preferably 20% by mass or more. The amount of BR is also preferably 70% by mass or less, more preferably 60% by mass or less. For use in tires requiring grip performance, it is preferably 40% by mass or less. With less than 10% by mass or more than 70% by mass of BR, abrasion resistance, grip performance, or fuel economy tends to be insufficient.

Examples of the NR include those commonly used in the tire industry, such as SIR20, RSS#3, and TSR20.

For use in tires of trucks and buses, the amount of NR based on 100% by mass of the diene rubber is preferably 60% to 100% by mass, while for use in tires of passenger vehicles or commercial vehicles, the amount of NR based on 100% by mass of the diene rubber is preferably 0% to 70% by mass. When the amount of NR is outside the range indicated above, sufficient grip performance, abrasion resistance, or durability may not be obtained.

The rubber component may include rubbers other than the diene rubber. Examples of other rubbers include butyl rubber (IIR).

The amount of the diene rubber based on 100% by mass of the total rubber component including other rubbers is 90% by mass or more, preferably 95% by mass or more. The upper limit of the amount is not particularly limited and may be 100% by mass.

The rubber composition in the present invention contains a hydrogenated terpene aromatic resin obtained by hydrogenation of the double bonds of a terpene aromatic resin. The hydrogenated terpene aromatic resin has a degree of hydrogenation of double bonds of 5% to 100% and a hydroxyl value of 20 mg KOH/g or less.

The term "terpene aromatic resin" used in the hydrogenated terpene aromatic resin refers to a compound obtained by copolymerizing an aromatic compound with a terpene compound by a usual method. Specifically, for example, the compound may be produced by adding dropwise raw materials in any order into an organic solvent such as toluene in the presence of a catalyst such as $BF_3$ and reacting the mixture at a predetermined temperature for a predetermined time.

The ratio between the aromatic compound and the terpene compound copolymerized may be chosen appropriately so that the resulting hydrogenated terpene aromatic resin has the physical properties described later. The terpene aromatic resin may contain copolymerization units other than the aromatic compound and terpene compound, such as indene, as long as the resulting hydrogenated terpene aromatic resin has the physical properties described later.

The aromatic compound may be any compound having an aromatic ring, and examples include phenol compounds such as phenol, alkylphenols, alkoxyphenols, and unsaturated hydrocarbon group-containing phenols; naphthol compounds such as naphthol, alkylnaphthols, alkoxynaphthols, and unsaturated hydrocarbon group-containing naphthols; and styrene derivatives such as styrene, alkylstyrenes, alkoxystyrenes, and unsaturated hydrocarbon group-containing styrenes, with styrene derivatives being preferred. The alkyl or alkoxy groups in the foregoing compounds each preferably have 1 to 20 carbon atoms, more preferably 1 to 12 carbon atoms. The unsaturated hydrocarbon groups in the foregoing compounds each preferably have 2 to 20 carbon atoms, more preferably 2 to 12 carbon atoms.

The aromatic compound may have one substituent or two or more substituents on the aromatic ring. In the case of the aromatic compound having two or more substituents on the aromatic ring, the substituents may be located at any of the ortho, meta, or para positions. Moreover, in the case of a styrene derivative having a substituent on the aromatic ring, the substituent may be at the ortho, meta, or para position with respect to the vinyl group of styrene.

The aromatic compounds may be used alone or in combinations of two or more.

Specific examples of the alkylphenols include methylphenol, ethylphenol, butylphenol, t-butylphenol, octylphenol, nonylphenol, decylphenol, and dinonylphenol. They may have the respective substituents at any of the ortho, meta, or para positions. Among these, t-butylphenol is preferred, with p-t-butylphenol being more preferred.

Specific examples of the alkylnaphthols include compounds obtained by replacing the phenol moiety of the alkylphenols with naphthol.

Specific examples of the alkylstyrenes include compounds obtained by replacing the phenol moiety of the alkylphenols with styrene.

Specific examples of the alkoxyphenols include compounds obtained by replacing the alkyl groups of the alkylphenols with the corresponding alkoxy groups. Specific examples of the alkoxynaphthols include compounds obtained similarly by replacing the alkyl groups of the alkylnaphthols with the corresponding alkoxy groups. Specific examples of the alkoxystyrenes include compounds obtained by replacing the alkyl groups of the alkylstyrenes with the corresponding alkoxy groups.

Examples of the unsaturated hydrocarbon group-containing phenols include compounds which contain at least one hydroxyphenyl group per molecule, and further in which at least one hydrogen atom of the phenyl group is substituted with an unsaturated hydrocarbon group. The unsaturated bond in the unsaturated hydrocarbon group may be a double bond or a triple bond.

Examples of the unsaturated hydrocarbon group include C2-C20 alkenyl groups.

Specific examples of the unsaturated hydrocarbon group-containing phenols include isopropenylphenol and butenylphenol. Specific examples of the unsaturated hydrocarbon group-containing naphthols and the unsaturated hydrocarbon group-containing styrenes are similarly described.

The terpene compound refers to a hydrocarbon represented by the compositional formula $(C_5H_8)_n$ or an oxygen-containing derivative thereof, each of which has a terpene basic skeleton and is classified into monoterpenes ($C_{10}H_{16}$), sesquiterpenes ($C_{15}H_{24}$), diterpenes ($C_{20}H_{32}$), and other terpenes. The terpene compound is not particularly limited but is preferably a cyclic unsaturated hydrocarbon. The terpene compound is also preferably free of a hydroxyl group.

Specific examples of the terpene compound include α-pinene, β-pinene, 3-carene (δ-3-carene), dipentene, limonene, myrcene, alloocimene, ocimene, α-phellandrene, α-terpinene, γ-terpinene, terpinolene, 1,8-cineole, 1,4-cineole, α-terpineol, β-terpineol, and γ-terpineol. Preferred among these are α-pinene, β-pinene, 3-carene (δ-3-carene), dipentene, and limonene, with α-pinene or limonene being more preferred, because they allow for a balanced improvement in grip performance and durability. The limonene may include any of d-, l-, and dl-limonenes.

These terpene compounds may be used alone, or two or more of these may be used in combination.

Examples of the terpene aromatic resins produced, for example, by copolymerization of styrene derivatives with limonene include compounds represented by the following formula (I):

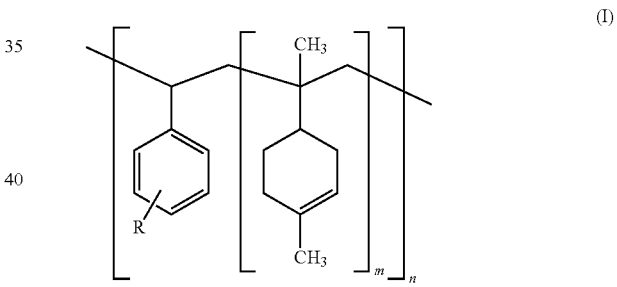

wherein R, which is a substituent on the aromatic ring, represents a C1-C20 alkyl group, a C1-C20 alkoxy group, or a C2-C20 unsaturated hydrocarbon group, provided that the number of substituents R may be 1 to 5, and when the number of substituents is two or more, the substituents may be the same as or different from each other and may also be located in any position; m is 0.2 to 20; and n is 2 to 10.

Specific examples of the terpene aromatic resin include YS resin TO125, YS resin TO115, YS resin TO105, YS resin TO85, and YS polyester UH115 all available from Yasuhara Chemical Co., Ltd.

The hydrogenated terpene aromatic resin in the present invention may be produced by hydrogenating the double bonds of the above-described terpene aromatic resin by a usual method. The hydrogenation may be carried out by, for example, catalytic hydrogen reduction using, as a catalyst, a noble metal such as palladium, ruthenium, rhodium, or nickel, either alone or supported on a carrier such as activated carbon, activated alumina, or diatomaceous earth.

The amount of the catalyst per 100% by mass of the starting terpene aromatic resin is preferably 0.1% to 50% by mass, more preferably 0.2% to 40% by mass. When the amount of the catalyst is less than 0.1% by mass, the hydrogenation reaction tends to slow down, while when the amount is more than 50% by mass, the catalyst may be left as an impurity which can act as an obstacle to filler dispersion or polymer dispersion, resulting in insufficient tensile strength or grip performance. The hydrogen pressure of the hydrogenation reaction is typically 5 to 200 kg/cm², preferably 50 to 100 kg/cm². If the hydrogen pressure is less than 5 kg/cm², the rate of the hydrogenation reaction tends to slow down, while if the hydrogen pressure is more than 200 kg/cm², the reaction equipment may be damaged or become difficult to maintain, resulting in poor productivity. Moreover, the temperature of the hydrogenation reaction is typically 10° C. to 200° C., preferably 20° C. to 150° C. If the reaction temperature is less than 10° C., the hydrogenation reaction tends to slow down, while if the reaction temperature is more than 200° C., the reaction equipment may be damaged or become difficult to maintain, resulting in poor productivity.

The hydrogenated terpene aromatic resin may be a commercial product such as YS polyster M80, YS polyster M105, YS polyster M115, and YS polyster M125 all available from Yasuhara Chemical Co., Ltd.

The hydrogenated terpene aromatic resin in the present invention prepared as above contains hydrogenated double bonds.

The hydrogenated terpene aromatic resin has a degree of hydrogenation of double bonds of 5% to 100%. In particular, the degree of hydrogenation of double bonds is preferably 6% or more, more preferably 7% or more, still more preferably 8% or more, further preferably 11% or more, particularly preferably 15% or more. The upper limit of the degree of hydrogenation of double bonds is not precisely defined at present because its preferred range may change due to factors related to hydrogenation reactions, such as advances in production technology (e.g. heating and pressurizing conditions, catalysts), or improvements in productivity. Under the current circumstances, the upper limit is preferably, for example, 80% or less, more preferably 60% or less, still more preferably 40% or less, further preferably 30% or less, particularly preferably 25% or less. If the degree of hydrogenation is less than 5%, grip performance (especially dry grip performance) or durability tends to be insufficient.

The degree of hydrogenation (hydrogenation ratio) is calculated from the integrals of the double bond peaks determined by ¹H-NMR (proton NMR) according to the equation below. The degree of hydrogenation (hydrogenation ratio) herein refers to the percentage of hydrogenated double bonds.

(Hydrogenation ratio (%))=((A−B)/A)×100 where A: the integral of the double bond peaks before hydrogenation;

B: the integral of the double bond peaks after hydrogenation.

For example, when the terpene aromatic resin used is a compound of formula (I) obtained by copolymerization of a styrene derivative and limonene, if the degree of hydrogenation is set to 100%, then a hydrogenated terpene aromatic resin represented by the formula (II) below will be obtained, while if the degree of hydrogenation is at least 5% but less than 100%, then, for example, a hydrogenated terpene aromatic resin represented by the formula (III) below will be obtained.

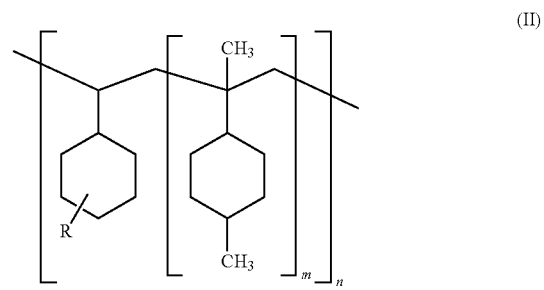

In formula (II), R, which is a substituent on the cyclohexane ring, represents a C1-C20 alkyl group, a C1-C20 alkoxy group, or a C2-C20 unsaturated hydrocarbon group, provided that the number of substituents R may be 1 to 5, and when the number of substituents is two or more, the substituents may be the same as or different from each other and may also be located in any position; m is 0.2 to 20; and n is 2 to 10.

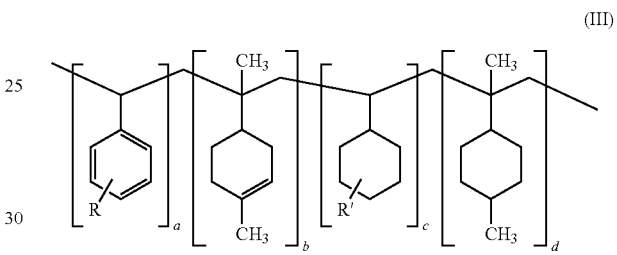

In formula (III), R, which is a substituent on the aromatic ring, represents a C1-C20 alkyl group, a C1-C20 alkoxy group, or a C2-C20 unsaturated hydrocarbon group, and R', which is a substituent on the cyclohexane ring, represents a C1-C20 alkyl group, a C1-C20 alkoxy group, or a C2-C20 unsaturated hydrocarbon group, provided that the number of substituents R or R' may be 1 to 5, and when the number of substituents is two or more, the substituents may be the same as or different from each other and may also be located in any position; a, b, c, and d represent the numbers of repeating units, and the repeating units may be linked in any order and may be arranged in blocks, alternately, or randomly.

Preferred embodiments of the hydrogenated terpene aromatic resin may also be described as, for example, resins containing repeating units of formula (II) containing a cyclohexyl group, provided that the resins may contain in the structure at least one repeating unit selected from the group consisting of repeating units of formula (I) and repeating units represented by the formula (IV) below. The repeating units may be linked in any order and may be arranged in blocks, alternately, or randomly.

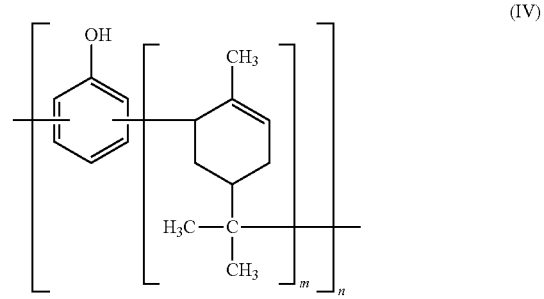

In formula (IV), m and n represent the numbers of repeating units.

The hydroxyl value of the hydrogenated terpene aromatic resin (i.e., corresponding to the phenol group content) is 20 mg KOH/g or less, preferably 10 mg KOH/g or less, more preferably 5 mg KOH/g or less, still more preferably 1 mg KOH/g or less, further preferably 0.1 mg KOH/g or less. Especially preferably, it is 0 mg KOH/g. If the hydroxyl value is more than 20 mg KOH/g, the resin may show increased self-aggregation and thus reduced affinity for rubber and filler, thereby failing to provide sufficient grip performance.

The hydroxyl value of the hydrogenated terpene aromatic resin refers to the amount of potassium hydroxide in milligrams required to neutralize the acetic acid which combines with hydroxyl groups on acetylation of 1 g of the hydrogenated terpene aromatic resin, and is measured by potentiometric titration (JIS K 0070:1992).

The hydrogenated terpene aromatic resin preferably has a softening point of 80° C. or higher, more preferably 90° C. or higher, still more preferably 100° C. or higher, further preferably 114° C. or higher, particularly preferably 116° C. or higher, most preferably 120° C. or higher. The softening point is also preferably 180° C. or lower, more preferably 170° C. or lower, still more preferably 165° C. or lower, particularly preferably 160° C. or lower, most preferably 135° C. or lower. A hydrogenated terpene aromatic resin having a softening point of lower than 80° C. tends to disperse well in rubber but to reduce grip performance, while a hydrogenated terpene aromatic resin having a softening point of higher than 180° C. tends to disperse poorly, thereby failing to provide sufficient grip performance, and also tends not to provide good durability.

The softening point of the hydrogenated terpene aromatic resin is determined in accordance with JIS K 6220-1:2001 using a ring and ball softening point measuring apparatus and is defined as the temperature at which the ball drops down.

The hydrogenated terpene aromatic resin preferably has a glass transition temperature (Tg) of 20° C. or higher, more preferably 30° C. or higher, still more preferably 40° C. or higher. The Tg is preferably 100° C. or lower, more preferably 90° C. or lower, still more preferably 80° C. or lower.

Herein, the glass transition temperature of the hydrogenated terpene aromatic resin is measured by differential scanning calorimetry (DSC) at a rate of temperature rise of 10° C./min in accordance with JIS K 7121.

The weight average molecular weight (Mw) of the hydrogenated terpene aromatic resin is not particularly limited, but is preferably 300 to 3,000, more preferably 500 to 2,000, still more preferably 600 to 2,000. When the Mw is less than 300, the G' value (hardness) of the adhesive layer tends to be low, leading to insufficient grip performance, while when the Mw is more than 3,000, rubber hardness tends to increase, resulting in insufficient grip performance or durability.

Herein, the weight average molecular weight of the hydrogenated terpene aromatic resin can be determined by gel permeation chromatography (GPC) (GPC-8000 series available from Tosoh Corporation, detector: differential refractometer, column: TSKGEL SUPERMALTPORE HZ-M available from Tosoh Corporation) calibrated with polystyrene standards.

The rubber composition in the present invention contains the hydrogenated terpene aromatic resin in an amount of 1 to 50 parts by mass per 100 parts by mass of the diene rubber. The amount of the hydrogenated terpene aromatic resin is preferably 2 parts by mass or more, more preferably 3 parts by mass or more, still more preferably 5 parts by mass or more. The amount is also preferably 40 parts by mass or less, more preferably 35 parts by mass or less, still more preferably 30 parts by mass or less. If the amount is less than 1 part by mass, grip performance or durability tends to be insufficient. If it is more than 50 parts by mass, hardness (handling performance) or fuel economy tends to be insufficient.

In the present invention, the difference in solubility parameter (SP value) between the diene rubber and the hydrogenated terpene aromatic resin is preferably 1.5 or less. When the difference in SP value is within the above range, the compatibility between the diene rubber and the hydrogenated terpene aromatic resin becomes better, resulting in further improved grip performance and durability. The difference in SP value is more preferably 1.0 or less. The lower limit of the difference in SP value is not particularly limited, but a smaller difference is more preferred.

The SP values of the diene rubber and the hydrogenated terpene aromatic resin mean solubility parameters calculated by Hoy's method according to the structure of the compounds. The Hoy's calculation is described in, for example, K. L. Hoy, "Table of Solubility Parameters", Solvent and Coatings Materials Research and Development Department, Union Carbites Corp. (1985).

The rubber composition in the present invention preferably contains at least one inorganic filler selected from the group consisting of compounds represented by the formula below, magnesium sulfate, and silicon carbide.

$$mM \cdot xSiO_y \cdot zH_2O$$

In the formula, M represents at least one metal selected from the group consisting of Al, Mg, Ti, Ca, and Zr, or an oxide or hydroxide of the metal; m represents an integer of 1 to 5; x represents an integer of 0 to 10; y represents an integer of 2 to 5; and z represents an integer of 0 to 10.

Examples of the compounds of the above formula include alumina, alumina hydrate, aluminum hydroxide, magnesium hydroxide, magnesium oxide, talc, titanium white, titanium black, calcium oxide, calcium hydroxide, magnesium aluminum oxide, clay, pyrophyllite, bentonite, aluminum silicate, magnesium silicate, calcium silicate, calcium aluminum silicate, magnesium silicate, zirconium, and zirconium oxide. These inorganic compounds may be used alone, or two or more of these may be used in combination.

Preferred are inorganic fillers in which M is Al or Zr metal or an oxide or hydroxide of the metal because they have a Mohs hardness of 3 or more and show water resistance and oil resistance, and they, when processed into micron-sized particles, produce a scratching effect or they promote blooming of adhesive components which provide grip performance, thereby improving grip performance, and also because they provide good processability, economic efficiency, and blowing resistance. More preferred is aluminum hydroxide or zirconium oxide because they are abundant resources and inexpensive. Aluminum hydroxide is particularly preferred as it further provides good kneading productivity and good extrusion processability.

The inorganic filler has a nitrogen adsorption specific surface area ($N_2SA$) of 10 to 120 $m^2/g$. When the $N_2SA$ is outside the above range, grip performance decreases and abrasion resistance deteriorates. The lower limit of the $N_2SA$ is preferably 13 $m^2/g$, while the upper limit of the $N_2SA$ is preferably 115 $m^2/g$, more preferably 110 $m^2/g$, still more preferably 80 $m^2/g$, particularly preferably 70 $m^2/g$.

The $N_2SA$ of the inorganic filler is determined by the BET method in conformity with ASTM D3037-81.

The inorganic filler preferably has a linseed oil absorption of 30 mL/100 g or more, more preferably 35 mL/100 g or more. The linseed oil absorption is also preferably 75 mL/100 g or less, more preferably 50 mL/100 g or less, particularly preferably 40 mL/100 g or less. When the linseed oil absorption is within the range indicated above, the resulting pneumatic tire can exhibit excellent grip performance and excellent durability. A smaller linseed oil absorption leads to fewer links (lower structure) between inorganic filler particles so that the inorganic filler particles are more likely to be individually present in the rubber. Accordingly, linseed oil absorption is considered to be used as an effective index for determining whether the individual inorganic filler particles in a nonpolar rubber composition for tires are moderately fine and form aggregates with moderate secondary particle sizes. Specifically, if the linseed oil absorption is less than 30 mL/100 g, it is considered that the affinity for the rubber component, softeners, resins, and similar components decreases so that the location of the inorganic filler in the rubber composition can be thermally unstable. Also, if the linseed oil absorption exceeds 75 mL/100 g, the inorganic filler particles form aggregates with large secondary particle sizes inside of which occlusion portions that will incorporate oil are formed, or which cannot be mixed sufficiently with the rubber component even after the kneading process, thereby causing deterioration of abrasion resistance, durability, or other properties. Moreover, while DBP oil absorption is generally used in this technical field, linseed oil, a natural oil, has another advantage in that it causes less environmental load than DBP.

For reference, ULTRASIL VN3 (available from Evonik, $N_2SA$: 175 $m^2/g$), a typical wet silica in which particle structure easily grows, has a linseed oil absorption of 128 mL/100 g.

The linseed oil absorption is determined in accordance with JIS K5101-13.

The inorganic filler preferably has an average particle size of 1.5 μm or less, more preferably 0.69 μm or less, still more preferably 0.6 μm or less. The average particle size is also preferably 0.2 μm or more, more preferably 0.25 μm or more, still more preferably 0.4 μm or more. When it is more than 1.5 μm, grip performance may decrease and durability may deteriorate. The inorganic filler having an average particle size of less than 0.2 μm may easily form secondary aggregates in rubber, adversely resulting in reduced grip performance and deteriorated durability.

The average particle size of the inorganic filler refers to a number average particle size as measured with a transmission electron microscope.

In order to ensure grip performance and durability of tires and to reduce metal wear of Banbury mixers and extruders, the inorganic filler preferably has a Mohs hardness of 7, which is equal to that of silica, or less than 7, more preferably of 2 to 5.

Mohs hardness, which is one of the mechanical properties of materials, is a measure commonly used through the ages in mineral-related fields. Mohs hardness is measured by scratching a material (e.g. aluminum hydroxide) to be analyzed for hardness with a reference material followed by checking for the presence of scratches.

In particular, it is preferred to use an inorganic filler which has a Mohs hardness of less than 7 and whose dehydration product has a Mohs hardness of 8 or more. For example, the use of aluminum hydroxide, which has a Mohs hardness of about 3, allows for the prevention of abrasion (wear) of Banbury mixers and rolls. In addition, the outer surface layer of aluminum hydroxide undergoes a dehydration reaction (transition) due to vibration or heat build-up during the middle and late periods of running and partially due to kneading and is thereby converted to alumina having a Mohs hardness of about 9, which is equal to or harder than that of the stones on the road, with the result that excellent grip performance and durability can be obtained. The internal aluminum hydroxide needs not to be entirely converted, and its partial conversion can provide the effect of scratching the road surface. Furthermore, aluminum hydroxide and alumina are stable to water, bases, and acids, and neither inhibit cure nor promote oxidative degradation. The inorganic filler after the transition more preferably has a Mohs hardness of 7 or more, with no upper limitation. Diamond has the highest hardness of 10.

The inorganic filler preferably has a thermal decomposition onset temperature (DSC endothermic onset temperature) of 160° C. to 500° C., more preferably 170° C. to 400° C. With a thermal decomposition onset temperature of lower than 160° C., the inorganic filler may be excessively thermally decomposed or reaggregated during kneading, so that the metal of the kneader rotor blades, the vessel wall, or the like may be excessively worn. The thermal decomposition onset temperature of the inorganic filler is determined by differential scanning calorimetry (DSC). The thermal decomposition includes dehydration reactions.

The inorganic filler may be a commercial product having the $N_2SA$ range indicated above, or may also be, for example, an inorganic filler having been processed into particles with the above properties by grinding or other treatments. The grinding treatment may be carried out by conventional methods, such as wet grinding or dry grinding using, for example, a jet mill, a current jet mill, a counter jet mill, or a contraplex mill.

If necessary, an inorganic filler having a predetermined $N_2SA$ may be prepared by fractionation by a membrane filtering method widely employed in the medical or biotechnology fields, before use as a compounding agent for rubber.

The amount of the inorganic filler per 100 parts by mass of the diene rubber is 1 part by mass or more, preferably 3 parts by mass or more, more preferably 5 parts by mass or more. With less than 1 part by mass of the inorganic filler, grip performance (especially wet grip performance) may be insufficient. Also, the amount is 70 parts by mass or less, preferably 60 parts by mass or less, more preferably 50 parts by mass or less, still more preferably 40 parts by mass or less. An amount of more than 70 parts by mass leads to insufficient filler dispersion and therefore poor grip performance (especially dry grip performance) or abrasion resistance.

Particularly for use in tires of passenger vehicles, the amount of the inorganic filler per 100 parts by mass of the diene rubber is preferably 10 to 20 parts by mass in order to simultaneously achieve grip performance and abrasion resistance.

The rubber composition in the present invention preferably contains carbon black to provide reinforcing properties, grip performance, and prevention of UV-induced degradation.

The carbon black preferably has a nitrogen adsorption specific surface area ($N_2SA$) of 100 $m^2/g$ or more, more preferably 110 $m^2/g$ or more, still more preferably 115 $m^2/g$ or more, particularly preferably 140 $m^2/g$ or more. The $N_2SA$ is also preferably 600 $m^2/g$ or less, more preferably 500 $m^2/g$ or less, still more preferably 400 $m^2/g$ or less. When it is less than 100 $m^2/g$, grip performance or abrasion resistance tends to decrease. When it is more than 600 $m^2/g$, good filler dispersion is less likely to occur, and thus reinforcing properties or durability tends to deteriorate. The $N_2SA$ of carbon black is determined by the BET method in conformity with JIS K 6217-2:2001.

The amount of carbon black varies depending on the desired grip performance, abrasion resistance, or fuel economy of the tire. In order to prevent UV-induced cracking, the amount of carbon black per 100 parts by mass of the diene rubber is desirably 5 parts by mass or more. When silica is used to ensure wet grip performance, the amount of carbon black per 100 parts by mass of the diene rubber is about 5 to 50 parts by mass. When carbon black is used to ensure dry grip performance and abrasion resistance, the amount of carbon black per 100 parts by mass of the diene rubber is preferably 50 to 160 parts by mass.

The rubber composition in the present invention may contain silica. The incorporation of silica improves rolling resistance properties while enhancing wet grip performance and reinforcing properties. This is a significant synergistic effect obtained by the combined use with the specific inorganic filler in the present invention, presumably due to the above-described mechanisms (1) and (B).

Examples of the silica include those produced by wet or dry processes.

The silica preferably has a nitrogen adsorption specific surface area ($N_2SA$) of 80 $m^2/g$ or more, more preferably 120 $m^2/g$ or more, still more preferably 150 $m^2/g$ or more. The $N_2SA$ is also preferably 280 $m^2/g$ or less, more preferably 260 $m^2/g$ or less, still more preferably 250 $m^2/g$ or less.

The $N_2SA$ of silica is determined by the BET method in conformity with ASTM D3037-93.

In applications where wet grip performance is more important than dry grip performance, the amount of silica per 100 parts by mass of the diene rubber is preferably 30 parts by mass or more, more preferably 60 parts by mass or more, still more preferably 75 parts by mass or more, further preferably 85 parts by mass or more, particularly preferably 90 parts by mass or more. When it is less than 30 parts by mass, sufficient reinforcing properties may not be obtained. The amount is also preferably 150 parts by mass or less, more preferably 130 parts by mass or less, still more preferably 120 parts by mass or less, particularly preferably 100 parts by mass or less. When it is more than 150 parts by mass, such silica is difficult to disperse, and therefore abrasion resistance, durability, or fuel economy tends to deteriorate.

When the rubber composition in the present invention contains silica, it preferably further contains a silane coupling agent. The silane coupling agent may be any silane coupling agent that has conventionally been used together with silica in the rubber industry.

In another suitable embodiment of the present invention, in view of grip performance and other properties, the rubber composition in the present invention further contains a softener. Any softener may be used, including oils, liquid diene polymers, and resins having a softening point of 160° C. or lower. In particular, the softener preferably includes an oil and a liquid diene polymer, and in a suitable embodiment of the present invention in view of grip performance, the softener further includes a resin having a softening point of 160° C. or lower.

Examples of the oil include process oils such as paraffinic process oils, aromatic process oils, and naphthenic process oils. In particular, preferred are oils having a smaller difference in solubility parameter (SP value) from the diene rubber. Oils having a smaller difference in SP value are miscible better with the diene rubber. The difference in SP value is preferably, for example, 1.0 or less. The lower limit of the difference in SP value is not particularly limited, but a smaller difference is more preferred.

The SP value of the oil is determined as described for the diene rubber and the hydrogenated terpene aromatic resin.

When an oil is incorporated, the amount of the oil per 100 parts by mass of the diene rubber is preferably 2 parts by mass or more, more preferably 5 parts by mass or more, though it varies depending on the desired grip performance and fuel economy of the tire, or in other words the filler content. The amount of the oil is preferably 85 parts by mass or less, more preferably 75 parts by mass or less. With less than 2 parts by mass of the oil, poor dispersion of fillers, polymers, or crosslinking agents such as sulfur may occur. With more than 85 parts by mass of the oil, durability or abrasion resistance tends to deteriorate.

As used herein, the amount of the oil includes the amount of the oil contained in oil extended rubber.

It should be noted that tires for trucks and buses, which require high abrasion resistance, durability, and chip resistance, often incorporate no oil.

The term "liquid diene polymer" refers to a diene polymer that is in the liquid state at a room temperature (25° C.)

The liquid diene polymer preferably has a polystyrene-equivalent weight average molecular weight (Mw) of $1.0 \times 10^3$ to $2.0 \times 10^5$, more preferably $3.0 \times 10^3$ to $1.5 \times 10^4$, as determined by gel permeation chromatography (GPC). A liquid diene polymer having a Mw of less than $1.0 \times 10^3$ may not be effective in improving grip performance and may fail to ensure sufficient durability, while a liquid diene polymer having a Mw of more than $2.0 \times 10^5$ may form an excessively viscous polymer solution, resulting in deterioration of productivity, or may reduce breaking properties.

The Mw of the liquid diene polymer as used herein is determined by gel permeation chromatography (GPC) calibrated with polystyrene standards.

Examples of the liquid diene polymer include liquid styrene-butadiene copolymers (liquid SBR), liquid polybutadiene polymers (liquid BR), liquid polyisoprene polymers (liquid IR), and liquid styrene-isoprene copolymers (liquid SIR). Preferred among these is liquid SBR because a good balance of durability and grip performance can be obtained.

When a liquid diene polymer is incorporated, the amount of the liquid diene polymer per 100 parts by mass of the diene rubber is preferably 5 parts by mass or more, more preferably 10 parts by mass or more. The amount is also preferably 120 parts by mass or less, more preferably 80 parts by mass or less, still more preferably 70 parts by mass or less, particularly preferably 30 parts by mass or less. With less than 5 parts by mass of the liquid diene polymer, sufficient grip performance tends not to be obtained. With more than 120 parts by mass of the liquid diene polymer, durability tends to deteriorate.

Examples of resins having a softening point of 160° C. or lower that can be used in combination with the hydrogenated terpene aromatic resin in the present invention include coumarone-indene resins, p-t-butylphenol acetylene resins, and styrene-acrylic resins.

The term "coumarone-indene resin" refers to a resin containing coumarone and indene as monomer components forming the backbone (main chain) of the resin. The backbone of the resin may contain, in addition to coumarone and indene, monomer components such as styrene, α-methylstyrene, methylindene, or vinyltoluene.

The coumarone-indene resin has a softening point of −20° C. to 160° C. The upper limit of the softening point is preferably 145° C. or lower, more preferably 130° C. or lower. The lower limit is preferably −10° C. or higher, more preferably −5° C. or higher. A coumarone-indene resin having a softening point of higher than 160° C. tends to exhibit poor dispersibility during kneading, resulting in deterioration of fuel economy. A coumarone-indene resin having a softening point of less than −20° C. is difficult to produce, and it is also more likely to migrate to other components and to volatilize, which may result in changes in properties during use.

When the coumarone-indene resin used has a softening point of 90° C. to 140° C., grip performance is improved.

The coumarone-indene resin particularly having a softening point of 100° C. to 120° C. can overall increase tan δ over a range of 0° C. to 80° C., and also provides good durability.

When the coumarone-indene resin used has a softening point of 10° C. to 30° C., it provides good grip performance at relatively low temperatures between 10° C. to 40° C., and overall reduces tan δ. Such a coumarone-indene resin having a softening point of 10° C. to 30° C. may be used mainly to improve durability.

The reason why durability is improved by the use of the coumarone-indene resin is probably that the coumarone-indene resin imparts moderate sliding properties to the crosslinked polymer chains, allowing for their uniform elongation.

The softening point of the coumarone-indene resin as used herein is determined in accordance with JIS K 6220-1:2001 using a ring and ball softening point measuring apparatus and is defined as the temperature at which the ball drops down.

The p-t-butylphenol acetylene resin may be a resin obtained by condensation of p-t-butylphenol and acetylene. The resin preferably has a softening point of 120° C. to 160° C. (e.g., Koresin having a softening point of 145° C.). The incorporation of such a p-t-butylphenol acetylene resin improves grip performance particularly at high temperatures (approximately 80 to 120° C.). The combined use of Koresin with an α-methylstyrene-based resin having a softening point of approximately 85° C., which provides excellent grip performance at low temperatures (10 to 40° C.), can improve grip performance at tire running temperatures between 20° C. and 120° C.

The softening point of the p-t-butylphenol acetylene resin can be determined as described for the coumarone-indene resin.

The p-t-butylphenol acetylene resin preferably has a hydroxyl value of 100 mg KOH/g or more, more preferably 150 mg KOH/g or more, still more preferably 175 mg KOH/g or more. The hydroxyl value is also preferably 300 mg KOH/g or less, more preferably 250 mg KOH/g or less, still more preferably 200 mg KOH/g or less.

The hydroxyl value of the p-t-butylphenol acetylene resin can be determined as described for the hydrogenated terpene aromatic resin.

The rubber composition in the present invention may appropriately contain, in addition to the above-described components, compounding agents commonly used in the tire industry, such as waxes, zinc oxide, stearic acid, releasing agents, antioxidants, vulcanizing agents, e.g. sulfur, and vulcanization accelerators.

Any zinc oxide may be used in the present invention, including, for example, those used in the rubber field such as in tires. For better dispersion of zinc oxide and higher abrasion resistance, the zinc oxide may suitably be finely divided zinc oxide. Specifically, the zinc oxide preferably has an average primary particle size of 200 nm or less, more preferably 100 nm or less. The lower limit of the average primary particle size is not particularly limited, but is preferably 20 nm or more, more preferably 30 nm or more.

The average primary particle size of the zinc oxide refers to an average particle size (average primary particle size) calculated from the specific surface area determined by the BET method based on nitrogen adsorption. The zinc oxide preferably has a specific surface area ($N_2SA$) of 10 to 50 $m^2/g$ as determined by the BET method based on nitrogen adsorption.

When zinc oxide is incorporated, the amount of zinc oxide per 100 parts by mass of the diene rubber is preferably 0.5 to 10 parts by mass or less, more preferably 1 to 5 parts by mass. When the amount of zinc oxide is within the range indicated above, the effects of the present invention can be more suitably achieved.

Examples of vulcanization accelerators that can be used in the present invention include sulfenamide vulcanization accelerators, thiazole vulcanization accelerators, thiuram vulcanization accelerators, guanidine vulcanization accelerators, and dithiocarbamate vulcanization accelerators. These vulcanization accelerators may be used alone, or two or more of these may be used in combination. Among these, suitable in the present invention are sulfenamide, thiuram, guanidine, and dithiocarbamate vulcanization accelerators, with combinations of sulfenamide and guanidine vulcanization accelerators being particularly preferred.

Examples of sulfenamide vulcanization accelerators include N-tert-butyl-2-benzothiazolylsulfenamide (TBBS), N-cyclohexyl-2-benzothiazolylsulfenamide (CBS), and N,N-dicyclohexyl-2-benzothiazolylsulfenamide (DCBS).

Examples of thiuram vulcanization accelerators include tetramethylthiuram disulfide (TMTD), tetrabenzylthiuram disulfide (TBzTD), and tetrakis(2-ethylhexyl)thiuram disulfide (TOT-N).

Examples of guanidine vulcanization accelerators include diphenylguanidine (DPG), diorthotolylguanidine, and orthotolylbiguanidine.

Examples of dithiocarbamate vulcanization accelerators include zinc dibenzyldithiocarbamate (ZTC) and zinc ethylphenyldithiocarbamate (PX).

When a vulcanization accelerator is incorporated, the amount of the vulcanization accelerator per 100 parts by mass of the diene rubber is preferably 1 part by mass or more, more preferably 2 parts by mass or more, but preferably 15 parts by mass or less, more preferably 10 parts by mass or less. An amount of less than 1 part by mass tends not to provide a sufficient cure rate, resulting in a failure to achieve good grip performance or durability. An amount of more than 15 parts by mass may lead to excessively tight crosslink density or blooming, resulting in deterioration of grip performance, durability, or building tack.

The rubber composition for treads in the present invention can be prepared by conventional methods.

For example, first, components excluding sulfur and vulcanization accelerators are incorporated (added) and kneaded in a rubber kneading machine such as a Banbury mixer or open roll mill to obtain a kneadate (base kneading step). Subsequently, the sulfur and vulcanization accelerators are further incorporated with (added to) the kneadate and kneaded, followed by vulcanization, whereby the rubber composition can be prepared.

The base kneading step is not particularly limited as long as the rubber component including a diene rubber and other components are kneaded. The base kneading step may be carried out in a single step or may be divided into two steps where the rubber component is previously kneaded with some components including the hydrogenated terpene aromatic resin, and then the kneadate is kneaded with the other components, excluding sulfur and vulcanization accelerators.

The rubber composition is used in treads of pneumatic tires and particularly suitably in cap treads which form outer surface layers of treads having a multilayer structure. The rubber composition is suitable for, for example, an outer surface layer of a tread with a two-layer structure consisting of an outer surface layer (cap tread) and an inner surface layer (base tread).

The pneumatic tire of the present invention can be formed from the above-described rubber composition by usual methods.

Specifically, the rubber composition containing the components described above, before vulcanization, is extruded and processed into the shape of a tread and then assembled with other tire components on a tire building machine in a usual manner to build an unvulcanized tire. The unvulcanized tire is heat pressed in a vulcanizer to produce a tire.

The pneumatic tire of the present invention is suitable for passenger vehicles, large passenger vehicles, large SUVs, heavy duty vehicles such as trucks and buses, and light trucks, particularly preferably for passenger vehicles. The pneumatic tire can be used as a summer tire or studless winter tire for those vehicles.

Examples

The present invention will be specifically described below with reference to, but not limited to, examples.

The chemicals used in the examples and comparative examples are listed below.

<SBR>

Modified SBR 1 for silica: a product prepared as described later (oil extended [oil content: 37.5 parts by mass per 100 parts by mass of rubber solids], styrene content: 41% by mass, vinyl content: 40% by mass, glass transition temperature: −29° C., weight average molecular weight: 1,190,000, SP value: 8.60)

N9548: Nipol 9548 (E-SBR, oil extended [oil content: 37.5 parts by mass per 100 parts by mass of rubber solids], styrene content: 35% by mass, vinyl content: 18% by mass, glass transition temperature: −40° C., weight average molecular weight: 1,090,000, SP value: 8.50) available from Zeon Corporation Modified SBR 2 for silica: a product prepared as described later (non-oil extended, styrene content: 27% by mass, vinyl content: 58% by mass, glass transition temperature: −27° C., weight average molecular weight: 720,000, SP value: 8.55)

NS612: Nipol NS612 (S-SBR, non-oil extended, styrene content: 15% by mass, vinyl content: 30% by mass, glass transition temperature: −65° C., weight average molecular weight: 780,000, SP value: 8.40) available from Zeon Corporation

<BR>

CB25: BUNA-CB25 (rare earth-catalyzed BR synthesized using a Nd catalyst, vinyl content: 0.7% by mass, cis content: 97% by mass, glass transition temperature: −110° C., SP value: 8.20) available from Lanxess

<NR>

TSR20 (SP value: 8.10)

<Carbon Black>

HP180: HP180 ($N_2SA$: 175 $m^2/g$) available from Orion Engineered Carbons

<Silica>

VN3: ULTRASIL VN3 ($N_2SA$: 175 $m^2/g$, linseed oil absorption: 128 mL/100 g) available from Evonik <Aluminum Hydroxide>

Aluminum hydroxide 1: a wet synthesis product (average particle size: 2.7 μm, $N_2SA$: 274 $m^2/g$, linseed oil absorption: 104 mL/100 g, Mohs hardness: 3, Mohs hardness of its pyrolysate (alumina): 9, thermal decomposition onset temperature: 200° C.) available from Toda Kogyo Corp.

Aluminum hydroxide 2: a wet synthesis product (average particle size: 2.7 μm, $N_2SA$: 122 $m^2/g$, linseed oil absorption: 78 mL/100 g, Mohs hardness: 3, Mohs hardness of its pyrolysate (alumina): 9, thermal decomposition onset temperature: 200° C.) available from Toda Kogyo Corp.

Aluminum hydroxide 3: a dry ground product of ATH#B (average particle size: 0.5 μm, $N_2SA$: 95 $m^2/g$, linseed oil absorption: 42 mL/100 g, Mohs hardness: 3, Mohs hardness of its pyrolysate (alumina): 9, thermal decomposition onset temperature: 200° C.) available from Sumitomo Chemical Co., Ltd.

Aluminum hydroxide 4: a dry ground product of ATH#B (average particle size: 0.5 μm, $N_2SA$: 75 $m^2/g$, linseed oil absorption: 42 mL/100 g, Mohs hardness: 3, Mohs hardness of its pyrolysate (alumina): 9, thermal decomposition onset temperature: 200° C.) available from Sumitomo Chemical Co., Ltd.

Aluminum hydroxide 5: a dry ground product of ATH#B (average particle size: 0.3 μm, $N_2SA$: 35 $m^2/g$, linseed oil absorption: 37 mL/100 g, Mohs hardness: 3, Mohs hardness of its pyrolysate (alumina): 9, thermal decomposition onset temperature: 200° C.) available from Sumitomo Chemical Co., Ltd.

Aluminum hydroxide 6: ATH#B (average particle size: 0.6 μm, $N_2SA$: 15 $m^2/g$, linseed oil absorption: 40 mL/100 g, Mohs hardness: 3, Mohs hardness of its pyrolysate (alumina): 9, thermal decomposition onset temperature: 200° C.) available from Sumitomo Chemical Co., Ltd.

Aluminum hydroxide 7: HIGILITE H-43 (average particle size: 0.75 μm, $N_2SA$: 7 $m^2/g$, linseed oil absorption: 33 mL/100 g, Mohs hardness: 3, Mohs hardness of its pyrolysate (alumina): 9, thermal decomposition onset temperature: 200° C.) available from Showa Denko K.K.

<Terpene-Based Resin>

M125: YS Polyster M125 (degree of hydrogenation: 11%, softening point: 123° C., Tg: 69° C., hydroxyl value: 0 mg KOH/g, SP value: 8.52) available from Yasuhara Chemical Co., Ltd.

M115: YS Polyster M115 (degree of hydrogenation: 12%, softening point: 115° C., Tg: 59° C., hydroxyl value: 0 mg KOH/g, SP value: 8.52) available from Yasuhara Chemical Co., Ltd.

M105: YS Polyster M105 (degree of hydrogenation: 12%, softening point: 105° C., Tg: 48° C., hydroxyl value: 0 mg KOH/g, SP value: 8.52) available from Yasuhara Chemical Co., Ltd.

M80: YS Polyster M80 (degree of hydrogenation: 12%, softening point: 80° C., Tg: 23° C., hydroxyl value: 0 mg KOH/g, SP value: 8.52) available from Yasuhara Chemical Co., Ltd.

Resins 1 to 4: resins produced as described later

TO125: YS resin TO125 (aromatic modified terpene resin, degree of hydrogenation: 0%, softening point: 125° C., Tg: 64° C., hydroxyl value: 0 mg KOH/g, SP value: 8.73) available from Yasuhara Chemical Co., Ltd.

TO115: YS resin TO115 (aromatic modified terpene resin, degree of hydrogenation: 0%, softening point: 115° C., Tg: 54° C., hydroxyl value: 0 mg KOH/g, SP value: 8.73) available from Yasuhara Chemical Co., Ltd.

TO105: YS resin TO105 (aromatic modified terpene resin, degree of hydrogenation: 0%, softening point: 105° C., Tg: 45° C., hydroxyl value: 0 mg KOH/g, SP value: 8.73) available from Yasuhara Chemical Co., Ltd.

TO85: YS resin TO85 (aromatic modified terpene resin, degree of hydrogenation: 0%, softening point: 85° C., Tg: 25° C., hydroxyl value: 0 mg KOH/g, SP value: 8.73) available from Yasuhara Chemical Co., Ltd.

T160: YS Polyster T160 (terpene phenol resin, degree of hydrogenation: 0%, softening point: 160° C., Tg: 100° C., hydroxyl value: 60 mg KOH/g, SP value: 8.81) available from Yasuhara Chemical Co., Ltd.

G125: YS Polyster G125 (terpene phenol resin, degree of hydrogenation: 0%, softening point: 125° C., Tg: 67° C., hydroxyl value: 140 mg KOH/g, SP value: 9.07) available from Yasuhara Chemical Co., Ltd.

TP115: Sylvares TP115 (terpene phenol resin, degree of hydrogenation: 0%, softening point: 115° C., Tg: 55° C., OH value: 50 mg KOH/g, SP value: 8.77) available from Arizona Chemical <Petroleum-Derived Resin>
Koresin: dry ground Koresin (p-t-butylphenol acetylene resin [condensation resin of p-t-butylphenol and acetylene], softening point: 145° C., Tg: 98° C., hydroxyl value: 193 mg KOH/g, $N_2SA$: 4.1 $m^2/g$, SP value: 9.10) available from BASF V-120: Nitto resin coumarone V-120 (coumarone-indene resin, softening point: 120° C., hydroxyl value: 30 mg KOH/g, SP value: 9.00) available from Nitto Chemical Co., Ltd.

SA85: SYLVARES SA85 (α-methylstyrene-based resin [copolymer of α-methylstyrene and styrene], softening point: 85° C., Tg: 43° C., hydroxyl value: 0 mg KOH/g, SP value: 9.10) available from Arizona Chemical
<Oil>
AH-24: Diana Process AH-24 (SP value: 8.05) available from Idemitsu Kosan Co., Ltd.
<Liquid Diene Polymer>
L-SBR-820: L-SBR-820 (liquid SBR, Mw: 10,000) available from Kuraray Co., Ltd.
<Silane Coupling Agent>
Si75: silane coupling agent Si75 (bis(3-triethoxysilylpropyl)disulfide) available from Evonik
<Wax>
Ozoace 355: Ozoace 355 available from Nippon Seiro Co., Ltd.
<Antioxidant>
6PPD: Antigene 6C (N-phenyl-N'-(1,3-dimethyl)-p-phenylenediamine) available from Sumitomo Chemical Co., Ltd.

TMQ: NOCRAC 224 (2,2,4-trimethyl-1,2-dihydroquinoline polymer) available from Ouchi Shinko Chemical Industrial Co., Ltd.
<Stearic Acid>
Stearic acid: stearic acid "TSUBAKI" available from NOF Corporation
<Zinc Oxide>
Zinc oxide #2: zinc oxide #2 available from Mitsui Mining & Smelting Co., Ltd.
<Vulcanizing Agent>
5% oil-containing powder sulfur: HK-200-5 available from Hosoi Chemical Industry Co., Ltd.
<Vulcanization Accelerator>
DPG: NOCCELER D (N,N-diphenylguanidine) available from Ouchi Shinko Chemical Industrial Co., Ltd.

TBBS: NOCCELER NS-G (N-tert-butyl-2-benzothiazolyl-sulfenamide) available from Ouchi Shinko Chemical Industrial Co., Ltd.
Preparation of Chain End Modifier for SBR To a 250 mL measuring flask in a nitrogen atmosphere were charged 20.8 g of 3-(N,N-dimethylamino)propyltrimethoxysilane (available from AZmax. Co.) and then anhydrous hexane (available from Kanto Chemical Co., Inc.) to a total volume of 250 mL, whereby a chain end modifier was prepared.
Preparation of Modified SBR 1 for Silica A sufficiently nitrogen-purged 30 L pressure-resistant vessel was charged with 18 L of n-hexane, 800 g of styrene (available from Kanto Chemical Co., Inc.), 1,200 g of butadiene, and 1.1 mmol of tetramethylethylenediamine, and the temperature was raised to 40° C. Then, 1.8 mL of 1.6 M butyllithium (available from Kanto Chemical Co., Inc.) was added to the mixture, and the temperature was raised to 50° C., followed by stirring for three hours. Subsequently, 4.1 mL of the chain end modifier was added to the resulting mixture, followed by stirring for 30 minutes. To the reaction solution were added 15 mL of methanol and 0.1 g of 2,6-tert-butyl-p-cresol (available from Ouchi Shinko Chemical Industrial Co., Ltd.), and then 1,200 g of TDAE, followed by stirring for ten minutes. Thereafter, coagula were recovered from the polymer solution by steam stripping. The coagula were dried under reduced pressure for 24 hours to obtain modified SBR 1 for silica.
Preparation of Modified SBR 2 for Silica A sufficiently nitrogen-purged 30 L pressure-resistant vessel was charged with 18 L of n-hexane, 740 g of styrene (available from Kanto Chemical Co., Inc.), 1,260 g of butadiene, and 10 mmol of tetramethylethylenediamine, and the temperature was raised to 40° C. Then, 10 mL of butyllithium was added to the mixture, and the temperature was raised to 50° C., followed by stirring for three hours. Subsequently, 11 mL of the chain end modifier was added to the resulting mixture, followed by stirring for 30 minutes. To the reaction solution were added 15 mL of methanol and 0.1 g of 2,6-tert-butyl-p-cresol. The reaction solution was then put in a stainless steel vessel containing 18 L of methanol, from which coagula were recovered. The coagula were dried under reduced pressure for 24 hours to obtain modified SBR 2 for silica.
Synthesis of Hydrogenated Terpene Aromatic Resin
(Synthesis of Resin 1)

To a sufficiently nitrogen-purged 3 L autoclave equipped with a stirring blade were charged 1 L of cyclohexane, 1 L of tetrahydrofuran (THF), 200 g of a starting resin (a production lot of TO125 [YS resin TO125 available from Yasuhara Chemical Co., Ltd.] with a measured softening point of 127° C.), and 10 g of 10% palladium carbon. The autoclave was purged with nitrogen and subsequently with hydrogen to a pressure of 5.0 $kg/cm^2$, followed by catalytic hydrogenation at 80° C. for 0.5 hours to obtain Resin 1. The yield was almost 100%.

In order to determine the degree of hydrogenation of double bonds of Resin 1, the resin (unhydrogenated TO125 or hydrogenated Resin 1) was added at a concentration of 15% by mass to carbon tetrachloride as a solvent, the mixture was subjected to 100 MHz proton NMR, and then the degree of hydrogenation of double bonds was calculated from the decrease in the intensity of the spectrum corresponding to unsaturated bonds (hereinafter, the degree of hydrogenation was determined in the same manner). As a result, the degree of hydrogenation of double bonds (hydrogenation ratio) of Resin 1 was found to be about 2%. The hydroxyl value (OH value), softening point, and SP value of Resin 1 were 0 mg KOH/g, 123° C., and 8.70, respectively.
(Synthesis of Resin 2)

Resin 2 was prepared as described above in "Synthesis of Resin 1", except that the catalytic hydrogenation was performed for one hour. The yield was almost 100%. The degree of hydrogenation of double bonds, hydroxyl value, softening point, and SP value of Resin 2 were found to be about 5%, 0 mg KOH/g, 123° C., and 8.68, respectively.
(Synthesis of Resin 3)

Resin 3 was prepared as described above in "Synthesis of Resin 1", except that the catalytic hydrogenation was performed for two hours. The yield was almost 100%. The degree of hydrogenation of double bonds, hydroxyl value, softening point, and SP value of Resin 3 were found to be about 8%, 0 mg KOH/g, 124° C., and 8.60, respectively.
(Synthesis of Resin 4)

Resin 4 was prepared as described above in "Synthesis of Resin 1", except that the catalytic hydrogenation was performed for four hours. The yield was almost 100%. The degree of hydrogenation of double bonds, hydroxyl value, softening point, and SP value of Resin 4 were found to be about 20%, 0 mg KOH/g, 127° C., and 8.48, respectively.

The conditions for synthesis, physical properties, and other items of Resins 1 to 4 and TO125 and M125 are summarized in the Table 1 below.

TABLE 1

| | Degree of hydrogenation (%) | SP value | Reaction time (hr) | Softening point (° C.) | Yield (%) |
|---|---|---|---|---|---|
| Resin 1 | 2 | 8.70 | 0.5 | 123 | 100 |
| Resin 2 | 5 | 8.68 | 1 | 123 | 100 |
| Resin 3 | 8 | 8.60 | 2 | 124 | 100 |
| Resin 4 | 20 | 8.48 | 4 | 127 | 100 |
| TO125 | 0 | 8.73 | (produced by the manufacturer) | 125 | — |
| M125 | 11 | 8.52 | (produced by the manufacturer) | 123 | — |

Examples and Comparative Examples

According to each of the formulations shown in Table 2, the compounding ingredients other than the sulfur and vulcanization accelerators were kneaded for five minutes at a discharge temperature of 150° C. using a 4.0 L Banbury mixer available from Kobe Steel, Ltd. To the kneadate were added the sulfur and vulcanization accelerators, and they were kneaded for four minutes at a discharge temperature of 95° C. using an open roll mill to obtain an unvulcanized rubber composition.

The unvulcanized rubber composition was press-vulcanized at 160° C. for 20 minutes to obtain a vulcanized rubber composition.

Separately, the unvulcanized rubber composition was extruded into a tread shape and assembled with other tire components on a tire building machine, followed by vulcanization at 160° C. for 20 minutes to obtain a test tire (tire size: 215/45R17 summer, passenger vehicle tire).

The vulcanized rubber compositions and test tires prepared as above were evaluated for the following items. Table 2 shows the results.

The item "softening point of terpene-based resins" was calculated from the softening points and percentages of the constituent polymers. The items "SP value of diene rubbers" and "SP value of terpene-based resins" are calculated from the SP values and percentages of the constituent polymers.

(Dry Grip Performance)

The test tires were mounted on a front-engine, rear-wheel-drive car of 2,000 cc displacement made in Japan. A test driver drove the car 10 laps around a test track under dry asphalt road conditions and then evaluated the stability of steering control. The results are expressed as an index, with Comparative Example 1 set equal to 100. A higher index indicates better dry grip performance.

(Wet Grip Performance)

The test tires were mounted on a front-engine, rear-wheel-drive car of 2,000 cc displacement made in Japan. A test driver drove the car 10 laps around a test track under wet asphalt road conditions and then evaluated the stability of steering control. The results are expressed as an index, with Comparative Example 1 set equal to 100. A higher index indicates better wet grip performance.

The target dry or wet grip performance index was 103 or higher on average.

(Tensile Test)

No. 3 dumbbell-shaped test pieces prepared from each vulcanized rubber composition were subjected to a tensile test at room temperature in accordance with JIS K 6251 "Rubber, vulcanized or thermoplastic—Determination of tensile stress-strain properties" to measure the elongation at break EB (%). The EB values are expressed as an index, with Comparative Example 1 set equal to 100. A higher index indicates better durability.

TABLE 2

| | | Ex. 1 | Com. Ex. 1 | Com. Ex. 2 | Com. Ex. 3 | Com. Ex. 4 | Com. Ex. 5 | Ex. 2 | Ex. 3 | Ex. 4 | Com. Ex. 6 | Ex. 5 |
|---|---|---|---|---|---|---|---|---|---|---|---|---|
| SBR | Modified SBR 1 for silica | 86.26 | 86.25 | 86.25 | 86.25 | 86.25 | 86.25 | 86.25 | 86.25 | 86.25 | 86.25 | 86.25 |
| | N9548 | — | — | — | — | — | — | — | — | — | — | — |
| | Modified SBR 2 for silica | — | — | — | — | — | — | — | — | — | — | — |
| | NS612 | — | — | — | — | — | — | — | — | — | — | — |
| BR | CB25 | 30 | 30 | 30 | 30 | 30 | 30 | 30 | 30 | 30 | 30 | 30 |
| NR | TSR20 | — | — | — | — | — | — | — | — | — | — | — |
| Carbon black | HP180 | 20 | 20 | 20 | 20 | 20 | 20 | 20 | 20 | 20 | 20 | 20 |
| Silica | VN3 | 90 | 90 | 90 | 90 | 90 | 90 | 90 | 90 | 90 | 90 | 90 |
| Aluminum hydroxide | Aluminum hydroxide 1 (N$_2$SA: 274 m$^2$/g) | — | — | — | — | — | — | — | — | — | — | — |
| | Aluminum hydroxide 2 (N$_2$SA: 122 m$^2$/g) | — | — | — | — | — | — | — | — | — | — | — |
| | Aluminum hydroxide 3 (N$_2$SA: 95 m$^2$/g) | — | — | — | — | — | — | — | — | — | — | — |
| | Aluminum hydroxide 4 (N$_2$SA: 75 m$^2$/g) | | | | | | | | | | | |

TABLE 2-continued

| | | | | | | | | | | | | | |
|---|---|---|---|---|---|---|---|---|---|---|---|---|---|
| | | Aluminum hydroxide 5 (N₂SA: 35 m²/g) | — | — | — | — | — | — | — | — | — | — | — |
| | | Aluminum hydroxide 6 (N₂SA: 15 m²/g) | 10 | 10 | 10 | 10 | 10 | 10 | 10 | 10 | 10 | 10 | 10 |
| | | Aluminum hydroxide 7 (N₂SA: 7 m²/g) | — | — | — | — | — | — | — | — | — | — | — |
| Terpene-based resin | Aromatic modified terpene resin | TO125 | — | — | 10 | — | — | — | — | 8 | 8 | — | — |
| | | TO115 | — | — | — | 10 | — | — | — | — | — | — | — |
| | | TO105 | — | — | — | — | 10 | — | — | — | — | — | — |
| | | TO85 | — | — | — | — | — | 10 | — | — | — | — | — |
| | Hydrogenated terpene aromatic resin | M125 | 10 | — | — | — | — | — | — | — | — | — | — |
| | | M115 | — | — | — | — | — | — | 10 | — | — | — | — |
| | | M105 | — | — | — | — | — | — | — | 2 | — | — | — |
| | | M80 | — | — | — | — | — | — | — | — | 2 | — | — |
| | | Resin 1 | — | — | — | — | — | — | — | — | — | 10 | — |
| | | Resin 2 | — | — | — | — | — | — | — | — | — | — | 10 |
| | | Resin 3 | — | — | — | — | — | — | — | — | — | — | — |
| | | Resin 4 | — | — | — | — | — | — | — | — | — | — | — |
| | Terpene phenol resin | T160 | — | — | — | — | — | — | — | — | — | — | — |
| | | G125 | — | — | — | — | — | — | — | — | — | — | — |
| | | TP115 | — | — | — | — | — | — | — | — | — | — | — |
| Petroleum-derived resin | Terpene-free resin | Koresin | — | — | — | — | — | — | — | — | — | — | — |
| | | V-120 | — | — | — | — | — | — | — | — | — | — | — |
| | | SA85 | — | 10 | — | — | — | — | — | — | — | — | — |
| Oil | | AH-24 | 10 | 10 | 10 | 10 | 10 | 10 | 10 | 10 | 10 | 10 | 10 |
| Liquid diene polymer | | L-SBR-820 | 10 | 10 | 10 | 10 | 10 | 10 | 10 | 10 | 10 | 10 | 10 |
| Silane coupling agent | | Si75 | 7.2 | 7.2 | 7.2 | 7.2 | 7.2 | 7.2 | 7.2 | 7.2 | 7.2 | 7.2 | 7.2 |
| Wax | | Ozoace355 | 1.5 | 1.5 | 1.5 | 1.5 | 1.5 | 1.5 | 1.5 | 1.5 | 1.5 | 1.5 | 1.5 |
| Antioxidant | | 6PPD | 2 | 2 | 2 | 2 | 2 | 2 | 2 | 2 | 2 | 2 | 2 |
| | | TMQ | 1 | 1 | 1 | 1 | 1 | 1 | 1 | 1 | 1 | 1 | 1 |
| Stearic acid | | Stearic acid | 3 | 3 | 3 | 3 | 3 | 3 | 3 | 3 | 3 | 3 | 3 |
| Zinc oxide | | #2 | 2 | 2 | 2 | 2 | 2 | 2 | 2 | 2 | 2 | 2 | 2 |
| Vulcanizing agent | | 5% Oil-containing sulfur powder | 1.30 | 1.30 | 1.30 | 1.30 | 1.30 | 1.30 | 1.30 | 1.30 | 1.30 | 1.30 | 1.30 |
| Vulcanization accelerator | | DPG | 2.5 | 2.5 | 2.5 | 2.5 | 2.5 | 2.5 | 2.5 | 2.5 | 2.5 | 2.5 | 2.5 |
| | | TBBS | 2.5 | 2.5 | 2.5 | 2.5 | 2.5 | 2.5 | 2.5 | 2.5 | 2.5 | 2.5 | 2.5 |
| Softening point of terpene-based resins (°C.) | | | 125 | — | 125 | 115 | 105 | 85 | 115 | 121 | 116 | 126 | 125 |
| SP value of diene rubbers | | | 8.48 | 8.48 | 8.48 | 8.48 | 8.48 | 8.48 | 8.48 | 8.48 | 8.48 | 8.48 | 8.48 |
| SP value of terpene-based resins | | | 8.52 | — | 8.73 | 8.73 | 8.73 | 8.73 | 8.52 | 8.69 | 8.69 | 8.70 | 8.66 |
| Total PHR | | | 289.3 | 289.3 | 289.3 | 289.3 | 289.3 | 289.3 | 289.3 | 289.3 | 289.3 | 289.3 | 289.3 |
| Evaluation result | Dry grip performance | | 107 | 100 | 102 | 100 | 100 | 96 | 104 | 100 | 97 | 102 | 103 |
| | Wet grip performance | | 109 | 100 | 105 | 103 | 103 | 95 | 106 | 107 | 107 | 105 | 106 |
| | Elongation at break EB (Target: ≥100) | | 102 | 100 | 100 | 100 | 100 | 102 | 102 | 101 | 105 | 100 | 102 |
| | Overall properties (Average of three properties) (Target: ≥103) | | 106 | 100 | 102 | 101 | 101 | 98 | 104 | 103 | 103 | 102 | 104 |

| | | | Ex. 6 | Ex. 7 | Ex. 8 | Com. Ex. 7 | Com. Ex. 8 | Com. Ex. 9 | Com. Ex. 10 | Com. Ex. 11 | Com. Ex. 12 | Com. Ex. 13 |
|---|---|---|---|---|---|---|---|---|---|---|---|---|
| SBR | | Modified SBR 1 for silica N9548 | 86.26 | 86.25 | 86.25 | 86.25 | 86.25 | 86.25 | 86.25 | 86.25 | 86.25 | 86.25 |
| | | Modified SBR 2 for silica NS612 | — | — | — | — | — | — | — | — | — | — |
| BR | | CB25 | 30 | 30 | 30 | 30 | 30 | 30 | 30 | 30 | 30 | 30 |
| NR | | TSR20 | — | — | — | — | — | — | — | — | — | — |
| Carbon black | | HP180 | 20 | 20 | 20 | 20 | 20 | 20 | 20 | 20 | 20 | 20 |
| Silica | | VN3 | 90 | 90 | 90 | 90 | 90 | 90 | 90 | 90 | 90 | 90 |
| Aluminum hydroxide | | Aluminum hydroxide 1 (N₂SA: 274 m²/g) | — | — | — | — | — | — | — | — | 10 | — |
| | | Aluminum hydroxide 2 (N₂SA: 122 m²/g) | — | — | — | — | — | — | — | — | — | 10 |

TABLE 2-continued

|  |  |  | | | | | | | | | | |
|---|---|---|---|---|---|---|---|---|---|---|---|---|
|  | Aluminum hydroxide 3 (N$_2$SA: 95 m$^2$/g) | | — | — | — | — | — | — | — | — | — | — |
|  | Aluminum hydroxide 4 (N$_2$SA: 75 m$^2$/g) | | — | — | — | — | — | — | — | — | — | — |
|  | Aluminum hydroxide 5 (N$_2$SA: 35 m$^2$/g) | | — | — | — | — | — | — | — | — | — | — |
|  | Aluminum hydroxide 6 (N$_2$SA: 15 m$^2$/g) | | 10 | 10 | 10 | 10 | 10 | 10 | 10 | 10 | — | — |
|  | Aluminum hydroxide 7 (N$_2$SA: 7 m$^2$/g) | | — | — | — | — | — | — | — | — | — | — |
| Terpene-based resin | Aromatic modified terpene resin | TO125 | — | — | 9 | — | — | — | — | — | — | — |
|  |  | TO115 | — | — | — | — | — | — | — | — | — | — |
|  |  | TO105 | — | — | — | — | — | — | — | — | — | — |
|  |  | TO85 | — | — | — | — | — | — | — | — | — | — |
|  | Hydrogenated terpene aromatic resin | M125 | — | — | 1 | — | — | — | — | — | 10 | 10 |
|  |  | M115 | — | — | — | — | — | — | — | — | — | — |
|  |  | M105 | — | — | — | — | — | — | — | — | — | — |
|  |  | M80 | — | — | — | — | — | — | — | — | — | — |
|  |  | Resin 1 | — | — | — | — | — | — | — | — | — | — |
|  |  | Resin 2 | — | — | — | — | — | — | — | — | — | — |
|  |  | Resin 3 | 10 | — | — | — | — | — | — | — | — | — |
|  |  | Resin 4 | — | 10 | — | — | — | — | — | — | — | — |
|  | Terpene phenol resin | T160 | — | — | — | 10 | — | — | — | — | — | — |
|  |  | G125 | — | — | — | — | 10 | — | — | — | — | — |
|  |  | TP115 | — | — | — | — | — | 10 | — | — | — | — |
| Petroleum-derived resin | Terpene-free resin | Koresin | — | — | — | — | — | — | 10 | — | — | — |
|  |  | V-120 | — | — | — | — | — | — | — | 10 | — | — |
|  |  | SA85 | — | — | — | — | — | — | — | — | — | — |
| Oil |  | AH-24 | 10 | 10 | 10 | 10 | 10 | 10 | 10 | 10 | 10 | 10 |
| Liquid diene polymer |  | L-SBR-820 | 10 | 10 | 10 | 10 | 10 | 10 | 10 | 10 | 10 | 10 |
| Silane coupling agent |  | Si75 | 7.2 | 7.2 | 7.2 | 7.2 | 7.2 | 7.2 | 7.2 | 7.2 | 7.2 | 7.2 |
| Wax |  | Ozoace355 | 1.6 | 1.5 | 1.5 | 1.5 | 1.5 | 1.5 | 1.5 | 1.5 | 1.5 | 1.6 |
| Antioxidant |  | 6PPD | 2 | 2 | 2 | 2 | 2 | 2 | 2 | 2 | 2 | 2 |
|  |  | TMQ | 1 | 1 | 1 | 1 | 1 | 1 | 1 | 1 | 1 | 1 |
| Stearic acid |  | Stearic acid | 3 | 3 | 3 | 3 | 3 | 3 | 3 | 3 | 3 | 3 |
| Zinc oxide |  | #2 | 2 | 2 | 2 | 2 | 2 | 2 | 2 | 2 | 2 | 2 |
| Vulcanizing agent |  | 5% Oil-containing sulfur powder | 1.30 | 1.30 | 1.30 | 1.30 | 1.30 | 1.30 | 1.30 | 1.30 | 1.30 | 1.30 |
| Vulcanization accelerator |  | DPG | 2.5 | 2.5 | 2.5 | 2.5 | 2.5 | 2.5 | 2.6 | 2.5 | 2.5 | 2.5 |
|  |  | TBBS | 2.5 | 2.5 | 2.5 | 2.5 | 2.5 | 2.5 | 2.5 | 2.5 | 2.5 | 2.5 |
| Softening point of terpene-based resins (° C.) | | | 123 | 124 | 126 | 160 | 125 | 115 | — | — | 125 | 125 |
| SP value of diene rubbers | | | 8.48 | 8.48 | 8.48 | 8.48 | 8.48 | 8.48 | 8.48 | 8.48 | 8.48 | 8.48 |
| SP value of terpene-based resins | | | 8.61 | 8.55 | 8.71 | 8.81 | 9.07 | 8.77 | — | — | 8.52 | 8.52 |
| Total PHR | | | 289.3 | 289.3 | 289.3 | 289.3 | 289.3 | 289.3 | 288.3 | 289.3 | 289.3 | 289.3 |
| Evaluation result | Dry grip performance | | 104 | 106 | 104 | 107 | 101 | 102 | 110 | 107 | 94 | 98 |
|  | Wet grip performance | | 107 | 108 | 108 | 94 | 96 | 104 | 88 | 90 | 96 | 101 |
|  | Elongation at break EB (Target: ≥100) | | 102 | 103 | 100 | 97 | 94 | 96 | 90 | 96 | 92 | 97 |
|  | Overall properties (Average of three properties) (Target: ≥103) | | 104 | 106 | 103 | 99 | 97 | 101 | 96 | 98 | 94 | 99 |

|  |  | Ex. 9 | Ex. 10 | Ex. 11 | Com. Ex. 14 | Com. Ex. 15 | Ex. 12 | Ex. 13 | Ex. 14 | Com. Ex. 16 | Com. Ex. 17 |
|---|---|---|---|---|---|---|---|---|---|---|---|
| SBR | Modified SBR 1 for silica | 86.25 | 86.26 | 86.26 | 86.25 | 86.25 | 86.25 | 86.25 | 86.25 | 86.25 | 86.25 |
|  | N9548 | — | — | — | — | — | — | — | — | — | — |
|  | Modified SBR 2 for silica | — | — | — | — | — | — | — | — | — | — |
|  | NS612 | — | — | — | — | — | — | — | — | — | — |
| BR | CB25 | 30 | 30 | 30 | 30 | 30 | 30 | 30 | 30 | 30 | 30 |
| NR | TSR20 | — | — | — | — | — | — | — | — | — | — |
| Carbon black | HP180 | 20 | 20 | 20 | 20 | 20 | 20 | 20 | 25 | 20 | 40 |
| Silica | VN3 | 90 | 90 | 90 | 90 | 90 | 90 | 90 | 90 | 90 | 90 |

TABLE 2-continued

| | | | | | | | | | | | | |
|---|---|---|---|---|---|---|---|---|---|---|---|---|
| Aluminum hydroxide | | Aluminum hydroxide 1 (N$_2$SA: 274 m$^2$/g) | — | — | — | — | — | — | — | — | — | — |
| | | Aluminum hydroxide 2 (N$_2$SA: 122 m$^2$/g) | — | — | — | — | — | — | — | — | — | — |
| | | Aluminum hydroxide 3 (N$_2$SA: 95 m$^2$/g) | 10 | — | — | — | — | — | — | — | — | — |
| | | Aluminum hydroxide 4 (N$_2$SA: 75 m$^2$/g) | — | 10 | — | — | — | — | — | — | — | — |
| | | Aluminum hydroxide 5 (N$_2$SA: 35 m$^2$/g) | — | — | 10 | — | — | — | — | — | — | — |
| | | Aluminum hydroxide 6 (N$_2$SA: 15 m$^2$/g) | — | — | — | — | — | 10 | 10 | 10 | 10 | 10 |
| | | Aluminum hydroxide 7 (N$_2$SA: 7 m$^2$/g) | — | — | — | 10 | — | — | — | — | — | — |
| Terpene-based resin | Aromatic modified terpene resin | TO125 | — | — | — | — | — | — | — | — | — | — |
| | | TO115 | — | — | — | — | — | — | — | — | — | — |
| | | TO105 | — | — | — | — | — | — | — | — | — | — |
| | | TO85 | — | — | — | — | — | — | — | — | — | — |
| | Hydrogenated terpene aromatic resin | M125 | 10 | 10 | 10 | 10 | 10 | 2 | 20 | 30 | 0.5 | 60 |
| | | M115 | — | — | — | — | — | — | — | — | — | — |
| | | M105 | — | — | — | — | — | — | — | — | — | — |
| | | M80 | — | — | — | — | — | — | — | — | — | — |
| | | Resin 1 | — | — | — | — | — | — | — | — | — | — |
| | | Resin 2 | — | — | — | — | — | — | — | — | — | — |
| | | Resin 3 | — | — | — | — | — | — | — | — | — | — |
| | | Resin 4 | — | — | — | — | — | — | — | — | — | — |
| | Terpene phenol resin | T160 | — | — | — | — | — | — | — | — | — | — |
| | | G125 | — | — | — | — | — | — | — | — | — | — |
| | | TP115 | — | — | — | — | — | — | — | — | — | — |
| Petroleum-derived resin | Terpene-free resin | Koresin | — | — | — | — | — | — | — | — | — | — |
| | | V-120 | — | — | — | — | — | — | — | — | — | — |
| | | SA85 | — | — | — | — | — | 8 | — | — | 9.5 | — |
| Oil | | AH-24 | 10 | 10 | 10 | 10 | 10 | 10 | — | — | — | — |
| Liquid diene polymer | | L-SBR-820 | 10 | 10 | 10 | 10 | 10 | 10 | 10 | 10 | 10 | 10 |
| Silane coupling agent | | Si75 | 7.2 | 7.2 | 7.2 | 7.2 | 7.2 | 7.2 | 7.2 | 7.2 | 7.2 | 7.2 |
| Wax | | Ozoace355 | 1.5 | 1.5 | 1.5 | 1.5 | 1.5 | 1.5 | 1.5 | 1.5 | 1.5 | 1.5 |
| Antioxidant | | 6PPD | 2 | 2 | 2 | 2 | 2 | 2 | 2 | 2 | 2 | 2 |
| | | TMQ | 1 | 1 | 1 | 1 | 1 | 1 | 1 | 1 | 1 | 1 |
| Stearic acid | | Stearic acid | 3 | 3 | 3 | 3 | 3 | 3 | 3 | 3 | 3 | 3 |
| Zinc oxide | | #2 | 2 | 2 | 2 | 2 | 2 | 2 | 2 | 2 | 2 | 2 |
| Vulcanizing agent | | 5% Oil-containing sulfur powder | 1.30 | 1.30 | 1.30 | 1.30 | 1.30 | 1.30 | 1.30 | 1.30 | 1.30 | 1.30 |
| Vulcanization accelerator | | DPG | 2.5 | 2.5 | 2.5 | 2.5 | 2.5 | 2.5 | 2.5 | 2.5 | 2.5 | 2.5 |
| | | TBBS | 2.5 | 2.5 | 2.5 | 2.5 | 2.5 | 2.5 | 2.5 | 2.5 | 2.5 | 2.5 |
| Softening point of terpene-based resins (° C.) | | | 125 | 125 | 125 | 125 | 125 | 125 | 125 | 125 | 125 | 125 |
| SP value of diene rubbers | | | 8.48 | 8.48 | 8.48 | 8.48 | 8.48 | 8.48 | 8.48 | 8.48 | 8.48 | 8.48 |
| SP value of terpene-based resins | | | 8.52 | 8.52 | 8.52 | 8.52 | 8.52 | 8.52 | 8.52 | 8.52 | 8.52 | 8.52 |
| Total PHR | | | 289.3 | 289.3 | 289.3 | 289.3 | 279.3 | 289.3 | 289.3 | 304.3 | 279.3 | 349.3 |
| Evaluation result | Dry grip performance | | 104 | 107 | 110 | 100 | 102 | 103 | 112 | 109 | 101 | 99 |
| | Wet grip performance | | 109 | 110 | 113 | 105 | 98 | 104 | 115 | 113 | 102 | 107 |
| | Elongation at break EB (Target: ≥100) | | 100 | 100 | 102 | 100 | 102 | 101 | 103 | 102 | 100 | 88 |
| | Overall properties (Average of three properties) (Target: ≥103) | | 104 | 106 | 108 | 102 | 101 | 103 | 110 | 108 | 101 | 98 |

TABLE 2-continued

| | | | Ex. 15 | Ex. 16 | Com. Ex. 18 | Ex. 17 | Ex. 18 | Ex. 19 | Ex. 20 | Ex. 21 | Ex. 22 | Ex. 23 |
|---|---|---|---|---|---|---|---|---|---|---|---|---|
| SBR | | Modified SBR 1 for silica | 86.25 | 86.25 | 86.25 | — | — | 41.25 | 86.25 | 86.25 | 86.25 | 86.25 |
| | | N9548 | — | — | — | 86.25 | — | — | — | — | — | — |
| | | Modified SBR 2 for silica | — | — | — | — | 85 | — | — | — | — | — |
| | | NS612 | — | — | — | — | — | 70 | — | — | — | — |
| BR | | CB25 | 30 | 30 | 30 | — | 15 | — | 30 | 30 | 30 | 30 |
| NR | | TSR20 | — | — | — | 30 | — | — | — | — | — | — |
| Carbon black | | HP180 | 20 | 20 | 20 | 20 | 20 | 20 | 20 | 20 | 20 | 20 |
| Silica | | VN3 | 85 | 75 | 55 | 90 | 90 | 90 | 90 | 90 | 90 | 90 |
| Aluminum hydroxide | | Aluminum hydroxide 1 ($N_2SA$: 274 $m^2/g$) | — | — | — | — | — | — | — | — | — | — |
| | | Aluminum hydroxide 2 ($N_2SA$: 122 $m^2/g$) | — | — | — | — | — | — | — | — | — | — |
| | | Aluminum hydroxide 3 ($N_2SA$: 95 $m^2/g$) | — | — | — | — | — | — | — | — | — | — |
| | | Aluminum hydroxide 4 ($N_2SA$: 75 $m^2/g$) | — | — | — | — | — | — | — | — | — | — |
| | | Aluminum hydroxide 5 ($N_2SA$: 35 $m^2/g$) | — | — | — | — | — | — | — | 20 | 20 | 20 | 20 |
| | | Aluminum hydroxide 6 ($N_2SA$: 15 $m^2/g$) | 20 | 40 | 80 | 10 | 10 | 10 | — | — | — | — |
| | | Aluminum hydroxide 7 ($N_2SA$: 7 $m^2/g$) | — | — | — | — | — | — | — | — | — | — |
| Terpene-based resin | Aromatic modified terpene resin | TO125 | — | — | — | — | — | — | — | — | — | — |
| | | TO115 | — | — | — | — | — | — | — | — | — | — |
| | | TO105 | — | — | — | — | — | — | — | — | — | — |
| | | TO85 | — | — | — | — | — | — | — | — | — | — |
| | Hydrogenated terpene aromatic resin | M125 | 10 | 10 | 10 | 10 | 10 | 10 | 10 | 10 | 10 | 10 |
| | | M115 | — | — | — | — | — | — | — | — | — | — |
| | | M105 | — | — | — | — | — | — | — | — | — | — |
| | | M80 | — | — | — | — | — | — | — | — | — | — |
| | | Resin 1 | — | — | — | — | — | — | — | — | — | — |
| | | Resin 2 | — | — | — | — | — | — | — | — | — | — |
| | | Resin 3 | — | — | — | — | — | — | — | — | — | — |
| | | Resin 4 | — | — | — | — | — | — | — | — | — | — |
| | Terpene phenol resin | T160 | — | — | — | — | — | — | 10 | — | — | — |
| | | G125 | — | — | — | — | — | — | — | — | — | — |
| | | TP115 | — | — | — | — | — | — | — | — | — | — |
| Petroleum-derived resin | Terpene-free resin | Koresin | — | — | — | — | — | — | — | 10 | — | — |
| | | V-120 | — | — | — | — | — | — | — | — | 10 | — |
| | | SA85 | — | — | — | — | — | — | — | — | — | 10 |
| Oil | | AH-24 | 10 | 10 | 10 | 10 | 26.25 | 5 | 10 | 10 | 10 | 10 |
| Liquid diene polymer | | L-SBR-820 | 10 | 10 | 10 | 10 | 10 | 10 | 10 | 10 | 10 | 10 |
| Silane coupling agent | | Si75 | 6.8 | 6.0 | 4.4 | 7.2 | 7.2 | 7.2 | 7.2 | 7.2 | 7.2 | 7.2 |
| Wax | | Ozoace355 | 1.5 | 1.5 | 1.5 | 1.5 | 1.5 | 1.5 | 1.5 | 1.5 | 1.5 | 1.5 |
| Antioxidant | | 6PPD | 2 | 2 | 2 | 2 | 2 | 2 | 2 | 2 | 2 | 2 |
| | | TMQ | 1 | 1 | 1 | 1 | 1 | 1 | 1 | 1 | 1 | 1 |
| Stearic acid | | Stearic acid | 3 | 3 | 3 | 3 | 3 | 3 | 3 | 3 | 3 | 3 |
| Zinc oxide | | # 2 | 2 | 2 | 2 | 2 | 2 | 2 | 2 | 2 | 2 | 2 |
| Vulcanizing agent | | 5% Oil-containing sulfur powder | 1.30 | 1.30 | 1.30 | 1.30 | 1.30 | 1.30 | 1.30 | 1.30 | 1.30 | 1.30 |
| Vulcanization accelerator | | DPG | 2.5 | 2.5 | 2.5 | 2.5 | 2.5 | 2.5 | 2.5 | 2.5 | 2.5 | 2.5 |
| | | TBBS | 2.5 | 2.5 | 2.5 | 2.5 | 2.5 | 2.5 | 2.5 | 2.5 | 2.5 | 2.5 |
| Softening point of terpene-based resins (° C.) | | | 125 | 125 | 125 | 125 | 125 | 125 | 143 | 125 | 125 | 125 |
| SP value of diene rubbers | | | 8.48 | 8.48 | 8.48 | 8.41 | 8.46 | 8.46 | 8.48 | 8.48 | 8.48 | 8.48 |
| SP value of terpene-based resins | | | 8.52 | 8.52 | 8.52 | 8.52 | 8.52 | 8.52 | 8.67 | 8.52 | 8.52 | 8.52 |
| Total PHR | | | 293.9 | 303.1 | 321.5 | 289.3 | 289.3 | 279.3 | 299.3 | 299.3 | 299.3 | 299.3 |

TABLE 2-continued

| | | | | | | | | | | | |
|---|---|---|---|---|---|---|---|---|---|---|---|
| Evaluation result | Dry grip performance | 104 | 102 | 87 | 113 | 107 | 108 | 119 | 119 | 117 | 107 |
| | Wet grip performance | 117 | 114 | 102 | 110 | 109 | 108 | 107 | 105 | 108 | 111 |
| | Elongation at break EB (Target: ≥100) | 101 | 102 | 88 | 104 | 104 | 103 | 101 | 100 | 103 | 101 |
| | Overall properties (Average of three properties) (Target: ≥103) | 107 | 106 | 92 | 109 | 107 | 106 | 109 | 108 | 109 | 106 |

The results shown in Table 2 demonstrate that wet grip performance, dry grip performance, and durability were highly improved while maintaining a good balance between them in the examples containing a predetermined amount of a hydrogenated terpene aromatic resin obtained by hydrogenation of the double bonds of a terpene aromatic resin and having a degree of hydrogenation of double bonds of 5% to 100% and a hydroxyl value of 20 mg KOH/g or less and a predetermined amount of a certain inorganic filler having a nitrogen adsorption specific surface area of 10 to 120 m²/g.

In addition, the improvements of the properties were found to be accomplished regardless of the amount of SBR, BR, or NR in the polymer system and the amount of carbon black or silica in the filler system.

The invention claimed is:

1. A pneumatic tire comprising a tread formed from a rubber composition,
wherein the rubber composition comprises
a rubber component that includes a diene rubber in an amount of 90% by mass or more based on 100% by mass of the rubber component,
wherein the diene rubber includes 60% by mass or more of a styrene-butadiene rubber having a styrene content of 19% to 60% by mass,
a hydrogenated terpene aromatic resin obtained by hydrogenation of the terpene aromatic resin double bonds, and
an inorganic filler,
wherein
the hydrogenated terpene aromatic resin has a degree of hydrogenation of double bonds of 5% to 100% and a hydroxyl value of 20 mg KOH/g or less, and is present in an amount of 1 to 50 parts by mass per 100 parts by mass of the diene rubber, and
the inorganic filler has a nitrogen adsorption specific surface area of 10 to 120 m²/g, is present in an amount of 1 to 70 parts by mass per 100 parts by mass of the diene rubber, and comprises at least one selected from the group consisting of compounds represented by the formula below, magnesium sulfate, and silicon carbide,

wherein M represents at least one metal selected from the group consisting of Al, Mg, Ti, Ca, and Zr, or an oxide or hydroxide of the metal; m represents an integer of 1 to 5; x represents an integer of 0 to 10; y represents an integer of 2 to 5; and z represents an integer of 0 to 10.

2. The pneumatic tire according to claim 1, wherein the inorganic filler is aluminum hydroxide.

3. The pneumatic tire according to claim 1, wherein the hydrogenated terpene aromatic resin has a hydroxyl value of 0 mg KOH/g.

4. The pneumatic tire according to claim 1, wherein the hydrogenated terpene aromatic resin is an hydrogenated form of the terpene aromatic resin of formula (I):

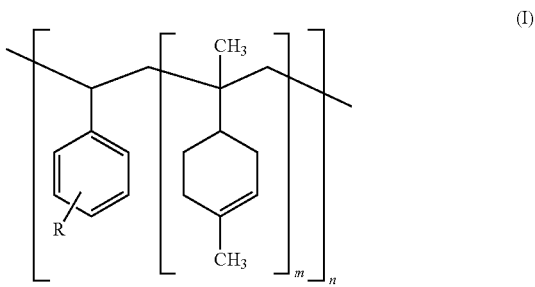

wherein R, which is a substituent on the aromatic ring, represents a C1-C20 alkyl group, a C1-C20 alkoxy group, or a C2-C20 unsaturated hydrocarbon group, provided that the number of substituents R may be 1 to 5, and when the number of substituents is two or more, the substituents may be the same as or different from each other and may also be located in any position; m is 0.2 to 20; and n is 2 to 10.

5. The pneumatic tire according to claim 1, wherein the inorganic filler is an oxide or hydroxide of Al, Mg, Ti, Ca or Zr.

6. The pneumatic tire according to claim 1, wherein the hydrogenated terpene aromatic resin has a softening point of 80° C. to 180° C.

7. The pneumatic tire according to claim 6, wherein the hydrogenated terpene aromatic resin has a softening point of 114° C. to 160° C.

8. The pneumatic tire according to claim 7, wherein the hydrogenated terpene aromatic resin has a hydroxyl value of 0 mg KOH/g.

9. The pneumatic tire according to claim 8, wherein the diene rubber includes 60% by mass or more of a styrene-butadiene rubber having a styrene content of 19% to 60% by mass.

10. The pneumatic tire according to claim 9, wherein the hydrogenated terpene aromatic resin is an hydrogenated form of the terpene aromatic resin of formula (I):

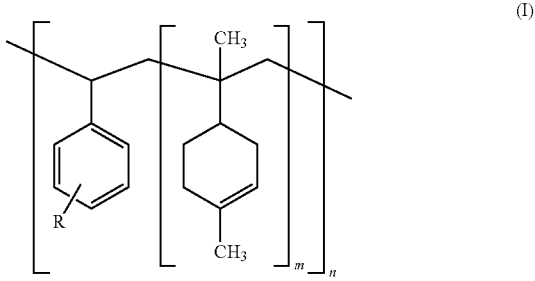

wherein R, which is a substituent on the aromatic ring, represents a C1-C20 alkyl group, a C1-C20 alkoxy group, or a C2-C20 unsaturated hydrocarbon group, provided that the number of substituents R may be 1 to 5, and when the number of substituents is two or more, the substituents may be the same as or different from each other and may also be located in any position; m is 0.2 to 20; and n is 2 to 10.

* * * * *